United States Patent
Bruce

(10) Patent No.: US 12,026,761 B2
(45) Date of Patent: Jul. 2, 2024

(54) OBTAINING AND DELIVERING AT LEAST ONE ALCOHOLIC BEVERAGE THROUGH AT LEAST ONE SUPPLY CHAIN

(71) Applicant: LiquorSplit IP, LLC, Coral Gables, FL (US)

(72) Inventor: Russell M. Bruce, Coral Gables, FL (US)

(73) Assignee: LiquorSplit IP, LLC, Coral Gables, FL (US)

(*) Notice: Subject to any disclaimer, the term of this patent is extended or adjusted under 35 U.S.C. 154(b) by 79 days.

(21) Appl. No.: 17/854,044

(22) Filed: Jun. 30, 2022

(65) Prior Publication Data
US 2023/0005034 A1    Jan. 5, 2023

Related U.S. Application Data

(60) Provisional application No. 63/216,544, filed on Jun. 30, 2021.

(51) Int. Cl.
| | |
|---|---|
| G06Q 30/06 | (2023.01) |
| G06Q 10/0832 | (2023.01) |
| G06Q 30/0207 | (2023.01) |
| G06Q 30/0251 | (2023.01) |
| G06Q 30/0601 | (2023.01) |

(52) U.S. Cl.
CPC ..... *G06Q 30/0605* (2013.01); *G06Q 10/0832* (2013.01); *G06Q 30/0207* (2013.01); *G06Q 30/0261* (2013.01); *G06Q 30/0607* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 6,523,741 | B1 | 2/2003 | DiMaria et al. |
| 6,920,431 | B2 | 7/2005 | Showghi et al. |
| 6,975,937 | B1 | 12/2005 | Kantarjiev et al. |

(Continued)

FOREIGN PATENT DOCUMENTS

| | | |
|---|---|---|
| WO | 9909508 A1 | 2/1999 |
| WO | 2004097550 A2 | 11/2004 |

OTHER PUBLICATIONS

Tims, D., "eVineyard Rises to No. 1 After Buying Rival Wine.com," [Abstract only], The Oregonian [Sunrise Edition] [Portland, Or] E01, Apr. 28, 2001. (Year: 2001).*

(Continued)

*Primary Examiner* — Nicholas D Rosen

(57) ABSTRACT

A method, non-transitory computer readable medium, and system for obtaining and delivering at least one alcoholic beverage through at least one supply chain are described. In some examples, the present disclosure includes obtaining and delivering at least one alcoholic beverage, through the supply chain, to at least one user. In some examples, the at least one alcoholic beverage can be delivered with at least one item that is not an alcoholic beverage. In some examples, the at least one alcoholic beverage can be delivered with at least one free alcoholic beverage obtained from a manufacturer. Some examples of the present disclosure also allow for management of inventory of alcoholic beverages throughout at least one supply chain.

14 Claims, 8 Drawing Sheets

(56) References Cited

U.S. PATENT DOCUMENTS

| | | |
|---|---|---|
| 7,124,098 B2 | 10/2006 | Hopson et al. |
| 7,708,189 B1 | 5/2010 | Cipriano |
| 7,945,477 B2 | 5/2011 | Werbitt |
| 8,600,821 B2 | 12/2013 | Borders et al. |
| 8,794,515 B2 | 8/2014 | Krell et al. |
| 8,880,427 B1 | 11/2014 | Jones |
| 8,880,428 B2 | 11/2014 | Woodward et al. |
| 9,125,046 B1* | 9/2015 | Narayana ............... H04L 41/12 |
| 9,286,631 B2 | 3/2016 | Krell et al. |
| 9,679,280 B2 | 6/2017 | Baril |
| 9,934,523 B1* | 4/2018 | Brock ............... G06Q 30/0639 |
| 10,878,519 B2 | 12/2020 | Beecher |
| 10,915,860 B2* | 2/2021 | Bloom ............... G06Q 10/0832 |
| 2004/0068443 A1 | 4/2004 | Hopson et al. |
| 2004/0243472 A1 | 12/2004 | Vadjinia |
| 2007/0061209 A1 | 3/2007 | Jackson |
| 2008/0103917 A1 | 5/2008 | Lauderdale |
| 2009/0132439 A1 | 5/2009 | Graham et al. |
| 2011/0173041 A1 | 7/2011 | Breitenbach et al. |
| 2015/0186944 A1* | 7/2015 | Forsblom ............ G06F 3/04842 705/14.64 |
| 2015/0186963 A1 | 7/2015 | Rellas et al. |
| 2017/0011475 A1 | 1/2017 | Glik |
| 2017/0193592 A1* | 7/2017 | Avidan ................. G06Q 10/087 |
| 2017/0270574 A1 | 9/2017 | Hessurg |
| 2020/0097894 A1* | 3/2020 | Bloom ................. G06Q 10/087 |
| 2020/0201921 A1* | 6/2020 | Fuller ................... G06F 16/958 |
| 2020/0372441 A1 | 11/2020 | Ruffkess et al. |

OTHER PUBLICATIONS

Alcohol Delivery. There's an app for that. The Wayback Machine—https://web.archive.org/web/20140123080254/http://www.drizly.com/home.php, Jan. 23, 2014.

SAUCEY Beer, The Wayback Machine—https://web.archive.org/web/20170520044856/https://www.saucey.com/ May 20, 2017.

"Alcohol Delivery on Your Smartphone.", The Wayback Machine—https://web.archive.org/web/20130810102402/https://www.getswill.com/ Aug. 10, 2013.

* cited by examiner

OBTAINING AND DELIVERING AT LEAST ONE ALCOHOLIC BEVERAGE THROUGH AT LEAST ONE SUPPLY CHAIN

RELATED APPLICATIONS

This application claims the benefit of U.S. Provisional Application No. 63/216,544, filed Jun. 30, 2021, which is incorporated herein by reference in its entirety for all purposes.

FIELD

Some embodiments of the present disclosure relate to beverage distribution, and more specifically to obtaining and delivering at least one alcoholic beverage through at least one supply chain.

BACKGROUND

Markets for alcoholic beverages can be highly regulated. While different jurisdictions have vastly different rules regarding the sale and distribution of alcoholic beverages, there is generally a strict division in the supply chain between manufacturers, distributors or pool buyers, retailers, and purchasers (i.e., users). This strict division can be driven by regulatory requirements in a given jurisdiction.

The strict division within the supply chain can limit the options that a single actor in the supply chain can utilize. For instance, in many jurisdictions, manufacturers can only sell to distributors or pool buyers. This can limit the options by which manufacturers can directly market to users. For instance, manufacturers may wish to provide a promotional giveaway to a user regarding a new type of alcoholic beverage. Due to regulations in many jurisdictions where the manufacturers can only sell to distributors or pool buyers, this is often not possible.

Additionally, in some jurisdictions, alcoholic beverage retailers may be restricted from selling certain items that are not alcoholic beverages. This restriction can come at the expense of users who may desire delivery of items that are not alcoholic beverages concurrently with delivery of alcoholic beverages.

Even further, the restrictions in the supply chain can prevent the entire supply chain from efficiently managing inventory. For instance, if a retailer and a distributor or pool buyer are out of stock of a particular alcoholic beverage, the retailer would need to wait until the manufacturer delivers the particular alcoholic beverage to the distributor or pool buyer and then wait until the distributor or pool buyer distributes the particular alcoholic beverage to the retailer.

While some alcohol delivery services may exist, these services have operated on a single portion of the supply chain. These services may deliver the alcoholic beverage from the retailer to the user only and do not involve a manufacturer and a distributor or pool buyer.

As such, there is a need for a technological solution that allows for management of a greater portion of the alcoholic beverage supply chain. Such a technological solution would, in some cases, provide an ability to concurrently combine an alcoholic beverage supply chain and non-alcoholic beverages within a single transaction. This technical solution would save computing efficiency and by streamlining multiple transactions which would otherwise occur on multiple levels of the supply chain. Such a technical solution would also improve the user experience by allowing for "real time" delivery of alcoholic beverages from any level of the supply chain. Such a technical solution would also improve the user experience by allowing the user to obtain free alcoholic beverages directly from manufacturer advertisements. The technical solution would also provide improved inventory management capabilities throughout the supply chain, which would also result in improved computing efficiency.

SUMMARY

To solve at least the above technical problems, a method, non-transitory computer readable medium, and system for obtaining and delivering at least one alcoholic beverage, through at least one supply chain, according to some embodiments of the present disclosure are described.

One or more embodiments of the method, non-transitory computer readable medium, and system include receiving an electronic request from at least one user to purchase at least one alcoholic beverage, determining a location of the at least one user, locating a distributor or pool buyer carrying the at least one alcoholic beverage requested by the at least one user, where the distributor or pool buyer is located at a first predetermined distance from the location of an alcoholic beverage retailer selling the at least one alcoholic beverage requested by the at least one user, locating the alcoholic beverage retailer, where the alcoholic beverage retailer is located at a second predetermined distance from the location of the at least one user, sending instructions to transfer the at least one alcoholic beverage from the distributor or pool buyer to the alcoholic beverage retailer, sending instructions to obtain the at least one alcoholic beverage from the alcoholic beverage retailer, and sending instructions to deliver the at least one alcoholic beverage to the at least one user.

A method, non-transitory computer readable medium, and system for obtaining and delivering at least one alcoholic beverage through a plurality of supply chains are described. At least one of the supply chains may comprise alcoholic beverages. At least one of the supply chains may comprise items that are not alcoholic beverages. According to one or more embodiments, the items that are not alcoholic beverages may comprise disparately regulated items. According to one or more embodiments, the items that are not alcoholic beverages may comprise unregulated items.

One or more embodiments of the method, non-transitory computer readable medium, and system for obtaining and delivering at least one alcoholic beverage through a plurality of supply chains include receiving an electronic request from at least one user, where the electronic request comprises a request to purchase at least one alcoholic beverage and a request to purchase at least one item that is not an alcoholic beverage, determining a location of the at least one user, locating a distributor or pool buyer carrying the at least one alcoholic beverage requested by the at least one user, where the distributor or pool buyer is located at a first predetermined distance from the location of an alcoholic beverage retailer selling the at least one alcoholic beverage requested by the at least one user, locating the alcoholic beverage retailer, where the alcoholic beverage retailer is located at a second predetermined distance from the location of the at least one user, sending instructions to transfer the at least one alcoholic beverage from the distributor or pool buyer to the alcoholic beverage retailer, locating at least one additional retailer selling the at least one item that is not an alcoholic beverage, where the at least one additional retailer is located at a third predetermined distance from the location of the at least one user, sending instructions to obtain the at least one alcoholic beverage from the alcoholic beverage retailer, sending instructions to obtain the at least one item that is not an alcoholic beverage from the at least one additional retailer selling the at least one item that is not an alcoholic beverage, and sending instructions to deliver the at least one alcoholic beverage and the at least one item that is not an alcoholic beverage to the at least one user.

One or more embodiments of the method, non-transitory computer readable medium, and system obtaining and delivering at least one alcoholic beverage through a plurality of supply chains include receiving an electronic request from at least one user, where the electronic request comprises a request to purchase at least one alcoholic beverage and a request to purchase at least one item that is not an alcoholic beverage, determining a location of the at least one user, locating a distributor or pool buyer carrying the at least one alcoholic beverage requested by the at least one user, where the distributor or pool buyer is located at a first predetermined distance from an alcoholic beverage retailer selling the at least one alcoholic beverage requested by the at least one user, locating the alcoholic beverage retailer, where the alcoholic beverage retailer is located at a second predetermined distance from the location of the at least one user, sending instructions to transfer the at least one alcoholic beverage from the distributor or pool buyer to the alcoholic beverage retailer, locating at least one additional retailer selling the at least one item that is not an alcoholic beverage, where the at least one additional retailer is located at a third predetermined distance from the location of the at least one user, obtaining the at least one alcoholic beverage from the alcoholic beverage retailer, obtaining the at least one item that is not an alcoholic beverage from the at least one additional retailer, delivering the at least one alcoholic beverage and the at least one item that is not an alcoholic beverage to the at least one user, charging the at least one user for the at least one alcoholic beverage and the at least one item that is not an alcoholic beverage.

A method, non-transitory computer readable medium, and system for obtaining and delivering at least one alcoholic beverage through at least one supply chain are described. One or more embodiments of the method, non-transitory computer readable medium, and system include determining a location of at least one user, retrieving advertising data, where the advertising data comprises information associated with the at least one free alcoholic beverage, presenting the advertising data to the at least one user, receiving an electronic request to purchase at least one alcoholic beverage, locating a distributor or pool buyer, where the distributor or pool buyer is located at a first predetermined distance from the location of an alcoholic beverage retailer, locating the alcoholic beverage retailer, where the alcoholic beverage retailer is located at a second predetermined distance from the location of the at least one user, sending instructions to transfer the at least one alcoholic beverage from the distributor or pool buyer to the alcoholic beverage retailer, obtaining the at least one alcoholic beverage from the alcoholic beverage retailer, obtaining the at least one free alcoholic beverage from a manufacturer, and delivering the at least one free alcoholic beverage and the at least one alcoholic beverage to the at least one user.

A method, non-transitory computer readable medium, and system for obtaining and delivering N alcoholic beverages through at least one supply chain are described. One or more embodiments of the method, non-transitory computer readable medium, and system include receiving an electronic request from at least one user, where the electronic request comprises a request to purchase N alcoholic beverages, where N≥1 and where N is a quantity of alcoholic beverages requested by the user, determining a location of the at least one user, locating an alcoholic beverage retailer, where the alcoholic beverage retailer is located at a first predetermined distance from the location of the at least one user, determining whether the alcoholic beverage retailer has at least N alcoholic beverages, obtaining, upon determining that the alcoholic beverage retailer has at least N alcoholic beverages, N alcoholic beverages from the alcoholic beverage retailer and delivering the N alcoholic beverages to the at least one user, locating a distributor or pool buyer upon determining that the alcoholic beverage retailer does not have at least N alcoholic beverages, where the distributor or pool buyer is located at a second predetermined distance from the location of the alcoholic beverage retailer, determining whether the distributor or pool buyer has at least N−M alcoholic beverages, where M<N, and where M is a number of alcoholic beverages possessed by the alcoholic beverage retailer upon determining that the alcoholic beverage retailer does not have the at least N alcoholic beverages, obtaining the M alcoholic beverages from the alcoholic beverage retailer upon determining that the distributor or pool buyer has at least N−M alcoholic beverages, obtaining the N−M alcoholic beverages from the distributor or pool buyer upon determining that the distributor or pool buyer has the at least N−M alcoholic beverages, delivering the N alcoholic beverages to the at least one user upon determining that the distributor or pool buyer has the at least N−M alcoholic beverages, locating a manufacturer upon determining that the distributor or pool buyer does not have at least N−M alcoholic beverages, where the manufacturer is located at a third predetermined distance from the location of the distributor or pool buyer, obtaining N−M−K alcoholic beverages from the manufacturer upon determining that the distributor or pool buyer does not have the at least N−M alcoholic beverages, where K<M<N, obtaining the K alcoholic beverages from the distributor or pool buyer upon determining that the distributor or pool buyer does not have the at least N−M alcoholic beverages, obtaining the M alcoholic beverages from the alcoholic beverage retailer upon determining that the distributor or pool buyer does not have the at least N−M alcoholic beverages, and delivering the N alcoholic beverages to the at least one user upon determining that the distributor or pool buyer does not have the at least N−M alcoholic beverages.

A method, non-transitory computer readable medium, and system for verifying inventory of N alcoholic beverages in at least one supply chain are described. One or more embodiments of the method, non-transitory computer readable medium, and system include receiving an electronic request from at least one inventory manager, where the electronic request comprises a request to verify that the retailer has N alcoholic beverages, where N≥1, locating an alcoholic beverage retailer, verifying that the alcoholic beverage retailer has at least N alcoholic beverages, locating a distributor or pool buyer upon determining that the alcoholic beverage retailer does not have at least N alcoholic beverages, determining whether the distributor or pool buyer has at least N−M alcoholic beverages upon determining that the alcoholic beverage retailer does not have at least N alcoholic beverages, where M<N, and where M is a number of alcoholic beverages possessed by the alcoholic beverage retailer, verifying that the distributor or pool buyer has at least N−M alcoholic beverages, and locating a manufacturer upon determining that the distributor or pool buyer does not have at least N−M alcoholic beverages.

DETAILED DESCRIPTION

Figure 1:
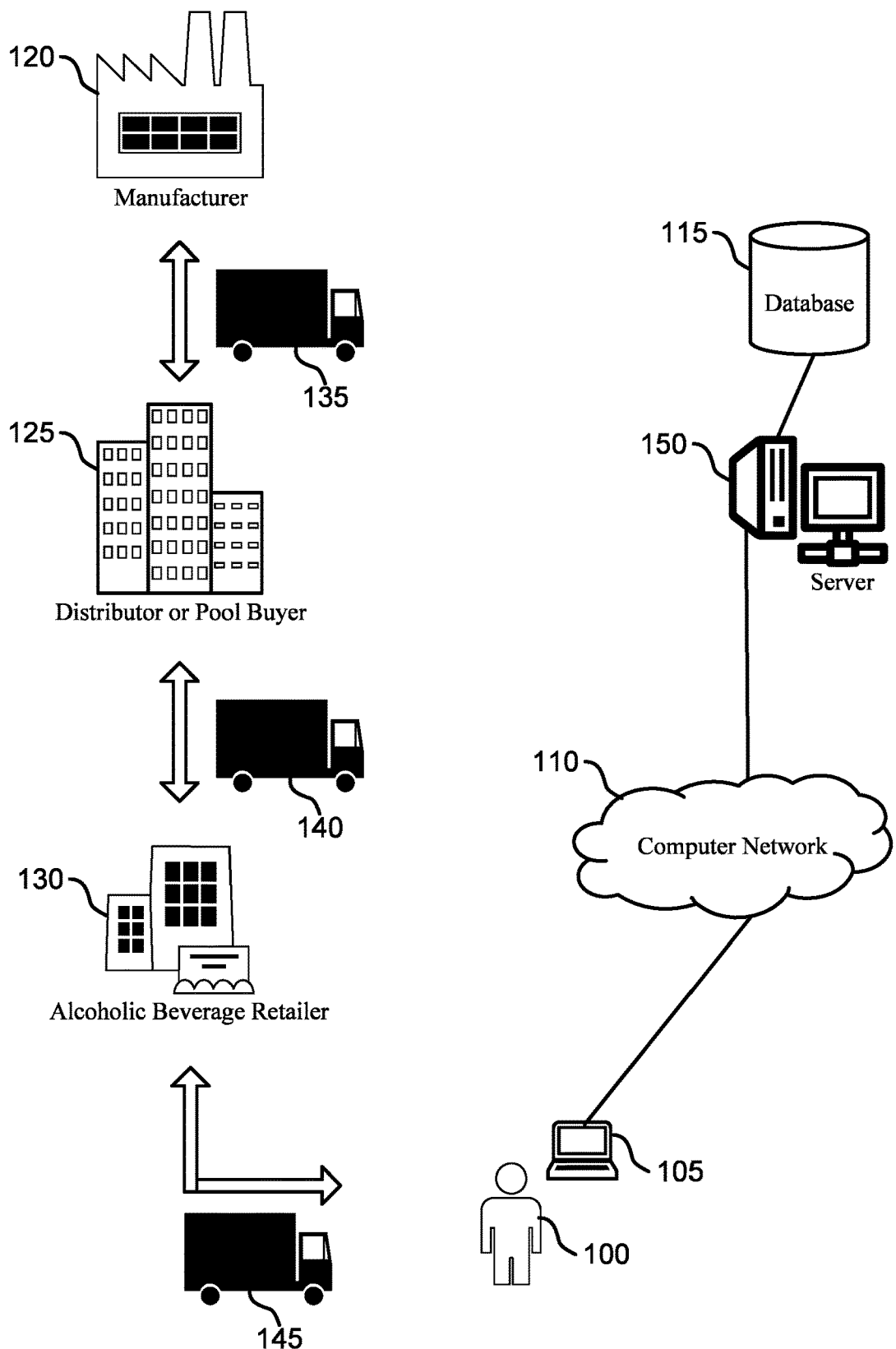
FIG. 1 and FIG. 2 show an exemplary alcoholic beverage distribution system according to non-limiting aspects of the present disclosure.

Some embodiments of the present disclosure relate to a computerized method. non-transitory computer readable medium, and system for obtaining and delivering at least one alcoholic beverage.

In some embodiments, the method, non-transitory computer readable medium, and system may comprise delivering at least one alcoholic beverage through a plurality of supply chains. At least one of the supply chains may comprise alcoholic beverages. At least one of the supply chains may comprise items that are not alcoholic beverages. According to one or more embodiments, the items that are not alcoholic beverages may comprise disparately regulated items. As used herein, "disparately regulated items" are items that are subject to a separate regulatory regime from alcoholic beverages. Examples of disparately regulated items, include but are not limited to, *cannabis* (where legal), firearms, and tobacco. According to one or more embodiments, the items that are not alcoholic beverages may comprise unregulated items. As used herein, "unregulated items" are items that are not subject to restrictions on sale, purchase, or title transfer in the ordinary course of business and trade. "Unregulated items" may in some cases be subject to regulations outside of the ordinary course of business and trade, such as, for instance, manufacturing or labeling regulations. In some embodiments, the disparately regulated items may include unregulated items. Due to their unregulated status, unregulated items are not subject to a regulatory regime during the ordinary course of business and trade. By contrast, alcoholic beverages may be subject to a regulatory regime in certain embodiments. Accordingly, unregulated items may be "disparately regulated" from alcohol because unregulated items are not regulated, whereas alcoholic beverages may be regulated.

As used herein, an "alcoholic beverage" generally refers to a beverage that includes alcohol. In some examples, an "alcoholic beverage" may be defined according to laws of a particular jurisdiction. For instance, in certain jurisdictions, a beverage that includes an amount of alcohol falling below a legal threshold, may not be considered an "alcoholic beverage" in certain embodiments of the present disclosure. In some examples, the alcoholic beverage may include, wine, beer, liquor, or any combination thereof.

One or more embodiments of the method, non-transitory computer readable medium, and system include receiving an electronic request from at least one user. As used herein, "at least one user" or "user" each may refer, without limitation, to a single user or a plurality of users. In certain examples, the "at least one user" may comprise a user of a device that is configured to facilitate at least one operation described herein. In certain examples, the electronic request may be received by at least one processor over a computer network.

In certain examples, the electronic request from the at least one user may include a request to purchase at least one alcoholic beverage. In some examples, the electronic request from the at least one user may include a request to purchase a plurality of alcoholic beverages. In certain implementations, the plurality of alcoholic beverages may be of one type or may include different types of alcoholic beverages without limitation.

In certain examples of the present disclosure, an exemplary method may include determining a location of the at least one user. Determining the location of the at least one user may, in some examples, be performed by the user locator described herein. In certain examples, the user locator may comprise a global positioning system (GPS) operating over a computer network. In certain examples, the user locator may be configured to work with a graphical user interface (GUI) of a device described herein. In some such examples, a user may input a location identifier, such as a zip code, into the GUI. The at least one processor described herein would then utilize the GPS to locate the at least one user based on the location identifier input by the at least one user. In other such examples, the location of the user may be automatically determined using pre-existing software that may be present on a device of the at least one user. In some examples, the user locator may take the form of a database that is pre-populated with a list of users and associated addresses. This database may be pre-populated, for example, when the user signs up for a service that utilizes the method, system, and computer readable medium described herein.

In some examples, the method, non-transitory computer readable medium, and system may comprise locating a manufacturer selling the at least one alcoholic beverage requested by the at least one user. As used herein, a "manufacturer" refers to a manufacturer of alcoholic beverages. Non-limiting examples of manufacturers according to the present disclosure may include Anheuser-Busch InBev, Heineken, Molson Coors, Brown-Forman, among many others.

In certain examples, a manufacturer must be licensed according to licensing requirements of the jurisdiction where the at least one user located. Determining the location of the manufacturer may, in some examples, be performed by the manufacturer locator described herein. In certain examples, the manufacturer locator may comprise the global positioning system (GPS) operating over the computer network described herein. In certain examples, the manufacturer locator may be configured to work with a graphical user interface (GUI) of a device described herein. In some such examples, a user may input a location identifier, such as a zip code, into the GUI. Upon receiving the zip code, a processor may instruct a display on a device of the at least one user to show at least one exemplary manufacturer that is within the first predetermined distance. In some examples, the processor may not display the location of the manufacturer. For instance, a user may request that the alcoholic beverage be of a specific type. In some such embodiments, the manufacturer locator may automatically, without input from the user, select a manufacturer that carries that specific type of alcoholic beverage. Where multiple manufacturers carry that specific type of alcoholic beverage, the manufacturer locator may select the manufacturer closest to the user. In some examples, the manufacturer locator may take the form of a database that is pre-populated with a list of manufacturers and associated addresses.

In some examples, the manufacturer is located at a first predetermined distance from the location of the distributor or pool buyer. The first predetermined distance is not particularly limited and can be, for example, 1 mile, 2 miles, 5 miles, 10 miles, 20 miles, 50 miles, 100 miles, or any combination thereof. In some examples, the first predetermined distance can be any distance if the user and the manufacturer are in the same jurisdiction (e.g., within the same state, city, or county of the United States.)

In some examples, the method, non-transitory computer readable medium, and system comprises locating a distributor or pool buyer. As used herein, a "distributor" is a company that is licensed to distribute alcoholic beverages from a manufacturer to a retailer. Non-limiting examples of distributors include Southern Wine & Spirits of California, Empire Merchants North LLC of New York, Fedway Associates, Inc of New Jersey, among many others. As used herein a "pool buyer" is a licensed cooperative of retailers that is authorized, within the relevant jurisdiction, to buy alcoholic beverages directly from a manufacturer. A non-limiting example of a pool buyer is the Florida Independent Liquor Co-op (FILC).

Determining the location of the distributor or pool buyer, in some examples, be performed by the distributor or pool buyer locator described herein. In certain examples, the distributor or pool buyer locator may comprise the global positioning system (GPS) operating over the computer network described herein. In certain examples, the distributor or pool buyer locator may be configured to work with a graphical user interface (GUI) of a device described herein. In some examples, the processor may not display the location of the distributor or pool buyer. Where multiple distributors or pool buyers carry that specific type of alcoholic beverage, the distributor or pool buyer locator may select the distributor or pool buyer closest to the user or at least one retailer. In some examples, the distributor or pool buyer locator may take the form of a database that is pre-populated with a list of distributors or pool buyers and associated addresses. This database may be pre-populated, for example, when a particular distributor or pool buyer signs up as a participant of a service that utilizes the method, system, and computer readable medium.

In some examples, the distributor or pool buyer is located at a second predetermined distance from the location of the alcoholic beverage retailer selling the at least one alcoholic beverage requested by the at least one user. The second predetermined distance is not particularly limited and can be, for example, in the same building, less than 1 mile, 1 mile, 2 miles, 5 miles, 10 miles, 20 miles, 50 miles, 100 miles, or any combination thereof. The second predetermined distance may be the same or different as the first predetermined distance. In some examples, the second predetermined distance can be any distance if the user, the manufacturer, and the distributor or pool buyer are in the same jurisdiction (e.g., within the same state, city, or county of the United States.)

In some examples, the manufacturer is not present in a particular supply chain. In some such embodiments, the distributor or pool buyer is located at a first predetermined distance from the location of an alcoholic beverage retailer selling the at least one alcoholic beverage requested by the at least one user. In some examples, the predetermined distance, may be less than 1 mile, such as but not limited to, when at least one of: the at least one user, the distributor or pool buyer, or a combination thereof are in a single building or are in walking distance from each other, where "walking distance" is defined as a distance of between 0 and 1 miles.

In some examples, the method, non-transitory computer readable medium, and system may include sending instructions to transfer the at least one alcoholic beverage from the manufacturer to the distributor or pool buyer. The transfer of the at least one alcoholic beverage from the manufacturer to the distributor or pool buyer can occur in "real time." As used herein "real time" is defined herein as a duration, measured from a time the at least one user initiates the electronic request, that does not exceed a predetermined threshold. In some examples, the predetermined threshold may be, less than or equal to 24 hours, less than or equal to 12 hours, less than or equal to 6 hours, less than or equal to 3 hours, less than or equal to 1 hour, less than or equal to 30 minutes, less than or equal to 15 minutes, less than or equal to 10 minutes, or less than or equal to 5 minutes. In some examples, the predetermined threshold may be: from 5 minutes to 24 hours, from 10 minutes to 24 hours, from 15 minutes to 24 hours, from 30 minutes to 24 hours, from 1 hour to 24 hours, from 3 hours to 24 hours, from 6 hours to 24 hours, from 12 hours to 24 hours, from 5 minutes to 12 hours, from 5 minutes to 6 hours, from 5 minutes to 3 hours, from 5 minutes to 1 hour, from 5 minutes to 30 minutes, from 5 minutes to 15 minutes, from 5 minutes to 10 minutes, from 10 minutes to 12 hours, from 15 minutes to 6 hours, from 30 minutes to 1 hour, from 1 minute to five minutes, five minutes or less, four minutes or less, three minutes or less, two minutes or less, or one minute or less.

The transferring of the at least one alcoholic beverage from the manufacturer to the distributor or pool buyer may be performed by at least one delivery vehicle. The at least one delivery vehicle is not particularly limited and may be a car, a truck, a plane, a boat, an unmanned aerial vehicle (i.e., a drone), a cycling device (e.g., a motorcycle or bicycle), a train, a helicopter, a hyperloop, a hand truck, a delivery cart, or any combination thereof.

In some examples, the method, non-transitory computer readable medium, and system may include locating an alcoholic beverage retailer. As used herein, an "alcoholic beverage retailer" is a retailer that is licensed to sell alcoholic beverages directly to consumers (i.e., users as defined by the present application) within a particular jurisdiction. In certain embodiments, the alcoholic beverage retailer may be a liquor store. In some implementations, the alcoholic beverage retailer may be a supermarket or a convenience store, provided that the supermarket or convenience store is licensed to sell alcoholic beverages in the jurisdiction where the at least one user is located. Determining the location of the alcoholic beverage retailer, in some examples, be performed by the alcoholic beverage retailer locator described herein. In certain examples, the alcoholic beverage retailer locator may comprise the global positioning system (GPS) operating over the computer network described herein. In certain examples, the alcoholic beverage retailer locator may be configured to work with a graphical user interface (GUI) of a device described herein. In some such examples, a user may input a location identifier, such as a zip code, into the GUI. Upon receiving the zip code, a processor may instruct a display on a device of the at least one user to show exemplary alcoholic beverage retailers that are within the first predetermined distance. In some examples, the processor may not display the location of the alcoholic beverage retailer. For instance, a user may request that the alcoholic beverage be of a specific type. In some such embodiments, the alcoholic beverage retailer locator may automatically, without input from the user, select an alcoholic beverage retailer that carries that specific type of alcoholic beverage. Where multiple alcoholic beverage retailers carry that specific type of alcoholic beverage, the alcoholic beverage retailer locator may select the alcoholic beverage retailer closest to the user. In some examples, the alcoholic beverage retailer may take the form of a database that is pre-populated with a list of alcoholic beverage retailer and associated addresses. This database may be pre-populated, for example, when a particular alcoholic beverage retailer signs up as a participant of a service that utilizes the method, system, and computer readable medium described herein.

In some embodiments, the alcoholic beverage retailer is located at a second or third predetermined distance from the location of the at least one user. The second or third predetermined distance is not particularly limited and can be, for example, 1 mile, 2 miles, 5 miles, 10 miles, 20 miles, 50 miles, 100 miles, or any combination thereof. The second or third predetermined distance may be the same or different from one another or the first predetermined distance. In some examples, the second or third predetermined distance can be any distance if the user, the manufacturer, the distributor or pool buyer, and the alcoholic beverage retailer are in the same jurisdiction (e.g., within the same state, city, or county of the United States.)

In some examples, the second predetermined distance, may be less than one mile, such as but not limited to, when at least one of: the at least one user, the alcoholic beverage retailer, the distributor or pool buyer, or a combination thereof are in a single building or are in walking distance from each other, where "walking distance" is defined as a distance of between 0 and 1 miles.

In some examples, the manufacturer is not present in a particular supply chain. In some such examples, the at least one alcoholic beverage retailer may be located at a second predetermined distance from the location of the at least one user.

Certain implementations may include transferring the at least one alcoholic beverage from the distributor or pool buyer to the alcoholic beverage retailer. The transfer of the at least one alcoholic beverage from the distributor or pool buyer to the alcoholic beverage retailer can occur in "real time" as defined herein above. The transferring of the at least one alcoholic beverage from the distributor or pool buyer to the alcoholic beverage retailer may be performed by at least one delivery vehicle. The at least one delivery vehicle is not particularly limited and may be a car, a truck, a plane, a boat, an unmanned aerial vehicle (i.e., a drone), a cycling device, a helicopter, a hand truck, a delivery cart, or any combination thereof. The at least one delivery vehicle used to transfer the at least one alcoholic beverage from the distributor or pool buyer to the alcoholic beverage retailer may be the same or different as the at least one delivery vehicle used to transfer the at least one alcoholic beverage from the manufacturer to the distributor or pool buyer, when present.

The method, non-transitory computer readable medium, and system may further include obtaining the at least one alcoholic beverage from the alcoholic beverage retailer and delivering the at least one alcoholic beverage to the at least one user. The delivering can occur in "real time" as defined herein above. The delivering may be performed by at least one delivery vehicle. The type of the at least one delivery vehicle is not particularly limited and may be any vehicle described herein above. The at least one delivery vehicle used to transfer the at least one alcoholic beverage from the distributor or pool buyer to the alcoholic beverage retailer may be the same or different as any of the delivery vehicles described herein. In some examples, a driver of the at least one delivery vehicle will verify identification of the at least one user (e.g., to determine if the at least one user is of drinking age.) In some examples identification of the at least one user can be verified during another step in the method, such as, but not limited to, when the at least one user signs up for a service that utilizes the method, system, and computer readable medium described herein. An exemplary sign-up process may for instance include receiving an image depicting an identification of the at least one user; and verifying the identification of the at least one user from the image. In some examples, the verification may be performed by, for instance, cross checking the image with a government database, by using facial recognition software, or by some other suitable mechanism. The image depicting an identification of the at least one user, may be an image of a driver's license, an image of a passport, or another suitable image depicting an identification of the at least one user. In certain implementations, a driver of the at least one delivery vehicle will deliver the at least one alcoholic beverage to a third party who will then deliver the at least one alcoholic beverage to the at least one user. The third party may, for example, be a building attendant (e.g., a door man) in non-limiting examples where the at least one user lives in an apartment building. In some of such implementations, the driver may verify an identification of the building attendant.

In some examples, the electronic request from at least one user may further comprise a request to purchase at least one item that is not an alcoholic beverage. The at least one item that is not an alcoholic beverage, may in some examples, be an item that is not permitted to be sold with alcoholic beverages in a particular jurisdiction. The at least one item that is not an alcoholic beverage is not particularly limited. In some examples, the at least one item that is not an alcoholic beverage is at least one food item, at least one toiletry item, at least one recreational item (e.g., ping-pong balls, a deck of cards), at least one item subject to a separate regulatory framework from alcohol, (e.g., a tobacco or *cannabis* product), at least one over the counter (OTC) drug (e.g., ibuprofen, naproxen, acetaminophen, or diphenhydramine), or any combination thereof.

Certain implementations may include, locating by the at least one processor, and over the computer network, at least one additional retailer. As used herein, the "at least one additional retailer" is at least one retailer selling the at least one item that is not an alcoholic beverage. The at least one additional retailer is not particular limited, and can be, for example, a supermarket, a convenience store, a fast-food restaurant, a drug store, a pizzeria, a dispensary, a tobacco shop, among many others.

In certain examples, the at least one additional retailer is located at a second, third, or fourth predetermined distance from the location of the at least one user. The second, third, or fourth predetermined distance is not particularly limited and can be, for example, 1 mile, 2 miles, 5 miles, 10 miles, 20 miles, 50 miles, 100 miles, or any combination thereof. The second, third, or fourth predetermined distance may be the same or different from each other or from the first predetermined distance. In some examples, the second, third, or fourth predetermined distance can be any distance if the user, the manufacturer, and the distributor or pool buyer are in the same jurisdiction (e.g., within the same state, city, or county of the United States.)

In some examples, the second, third, or fourth, predetermined distance may be less than one mile, such as but not limited to, when at least one of: the at least one user, the alcoholic beverage retailer, the distributor or pool buyer, the at least one additional retailer, or a combination thereof are in a single building or are in walking distance from each other, where "walking distance" is defined as a distance of between 0 and 1 miles.

In some examples, the manufacturer is not present in a particular supply chain. In some such embodiments, the at least one additional retailer is located at a second or third predetermined distance from the location of the at least one user. In some examples, the distributor or pool buyer is not present in a particular supply chain. In some such embodiments, the at least one additional retailer may be located at a second predetermined distance from the location of the at least one user.

Some examples of the method, non-transitory computer readable medium, and system include obtaining the at least one item that is not an alcoholic beverage from the at least one additional retailer and delivering the at least one alcoholic beverage and the at least one item that is not an alcoholic beverage to the at least one user.

In some examples, the method, non-transitory computer readable medium, and system include charging the at least one user for the at least one alcoholic beverage and the at least one item that is not an alcoholic beverage. The charging can occur through a service that utilizes the method, system, and computer readable medium described herein according to in some embodiments. In certain implementations, the charging can occur via a third-party service, such as but not limited to, Amazon™ Pay, PayPal™, Venmo™, or Stripe™. In some examples, the payment may occur via cryptocurrency. In some examples, a resulting charge appears as a single transaction or as multiple transactions on an account of the at least one user. A type of the account of the at least one user is not particularly limited and can, in some examples, be a bank account, a credit card account, an account of a third-party service (e.g., a PayPal™, Venmo™ balance), a cryptocurrency wallet, or any combination thereof. In some examples, the resulting charge appears as multiple transactions on the account of the at least one user. In some such examples, each transaction of the multiple transactions may be charged separately without any interaction by the user. This may be done for regulatory purposes in jurisdictions where charges for alcoholic beverages cannot be combined with charges for items that are not alcoholic beverages.

The method, non-transitory computer readable medium, and system may further include dividing the resulting charge between the alcoholic beverage retailer and the at least one additional retailer. In some examples, a resulting charge may be divided between the alcoholic beverage retailer, the at least one additional retailer, a driver of at least one delivery vehicle described herein, or any combination thereof. This may occur, in certain instances, where the driver is owed a delivery fee. In some examples, the dividing may occur without any interaction by the at least one user. In some embodiments, the dividing may occur without the user becoming aware that the dividing has occurred. In some implementations, the dividing is performed by: calculating, by the at least one processor over the computer network, a percentage of the resulting charge owed to the alcoholic beverage retailer, the at least one additional retailer, the a driver, or any combination thereof; and transferring by the at least one processor over the computer network, funds corresponding to the percentage of the resulting charge owed to the alcoholic beverage retailer, the at least one additional retailer, the a driver or any combination thereof.

In certain examples, the method, non-transitory computer readable medium, and system may include retrieving advertising data from the manufacturer. The advertising data may take any form, such as, but not limited to, a web-based advertisement, an advertisement embedded within a service that utilizes the method, system, and computer readable medium described herein, a social media post, or any combination thereof. In some examples, the advertising data comprises information associated with the at least one free alcoholic beverage. The information associated with the at least one free alcoholic beverage may be without limitation, at least one coupon, at least one discount code, at least one promotional giveaway, or any other suitable information. In certain implementations, the advertising data and associated information would otherwise (i.e., without the subject matter of the present disclosure) only be available to entities (e.g., a distributor or pool buyer) that can receive alcoholic beverages directly from a manufacturer. In some examples, the method, non-transitory computer readable medium, and system may include presenting the advertising data from the manufacturer to the at least one user. In some examples, a particular jurisdiction may not allow advertising data from the manufacturer to be displayed directly to the at least one user. In some such embodiments, the at least one free alcoholic beverage may be included as a giveaway item without performing any steps that include advertising data.

Presenting the advertising data may occur, for instance, by displaying an advertisement on a device) of the at least one user. In embodiments where the method, non-transitory computer readable medium, and system include retrieving advertising data, the method, non-transitory computer readable medium, and system may include receiving a first electronic request from the user to receive the at least one free alcoholic beverage of the promotional giveaway and receiving a second electronic request to purchase at least one additional alcoholic beverage. The at least one additional alcoholic beverage may be the same or different from the at least one free alcoholic beverage. The at least one additional alcoholic beverage may be from the same or a different manufacturer of the at least one free alcoholic beverage. In certain examples, the second electronic request to purchase at least one additional alcoholic beverage may be a condition precedent to receiving the at least one free alcoholic beverage from the first electronic request.

In some examples, the method, non-transitory computer readable medium, and system may obtain the at least one purchased alcoholic beverage from the alcoholic beverage retailer and obtain the at least one free alcoholic beverage from a manufacturer. This may be the point where multiple disparately regulated supply chains—i.e., a first supply chain comprising the at least one paid alcoholic beverage and a second supply chain comprising the at least one free alcoholic beverage—converge. The method, non-transitory computer readable medium, and system may, in certain examples include delivering the at least one free alcoholic beverage from the alcoholic beverage retailer and the at least one purchased alcoholic beverage from the manufacturer to the at least one user. The delivering can occur in "real time" as defined herein above. The delivering may be performed by at least one delivery vehicle described herein.

In certain examples, the method, non-transitory computer readable medium, and system may be used to deliver the at least one alcoholic beverage to the user even when at least one of: the retailer or the distributor or pool buyer does not have sufficient inventory of the at least one alcoholic beverage to fulfill the electronic request of the at least one user.

For instance, in some embodiments, the electronic request from at least one user may comprise a request to purchase N alcoholic beverages, where N≥1, and where N is a quantity of alcoholic beverages requested by the user. In some examples, N may refer to a number of a specific type of alcoholic beverage.

By way of example, the present section will take N=10, with the understanding that the value of N is not particularly limited. The method, non-transitory computer readable medium, and system would determine whether the alcoholic beverage retailer has at least N alcoholic beverages, where N=10. The determining can be performed automatically or manually. Manually determining can be performed using any mechanism known in the art, such as, but not limited to using a database to verify inventory. Automatically determining can be performed using any mechanism known in the art, such as, but not limited to, artificial intelligence, machine learning, database query, software or any combination thereof.

Upon determining that the alcoholic beverage retailer has at least N=10 alcoholic beverages, the N=10 alcoholic beverages can be delivered from the alcoholic beverage retailer to the at least one user. Upon determining that the alcoholic beverage retailer does not have at least N=10 alcoholic beverages, the method, non-transitory computer readable medium, and system would locate a distributor or pool buyer. The locating can occur manually or automatically, as described above.

The method, non-transitory computer readable medium, and system would then determine whether the distributor or pool buyer has at least N−M alcoholic beverages, where M<N, and where M is a number of alcoholic beverages possessed by the alcoholic beverage retailer. By way of example, the present section will take M=4, with the understanding that the value of M is not particularly limited. If M=4, then N−M=6. The method, non-transitory computer readable medium, and system would then determine that the distributor or pool buyer has at least N−M=6 alcoholic beverages.

Upon determining that the distributor or pool buyer has the at least N−M=6 alcoholic beverages, the M=4 alcoholic beverages from the alcoholic beverage retailer and the N−M=6 alcoholic beverages from the distributor or pool buyer can be delivered to the at least one user. The system may then, in some embodiments, initiate a real time transfer of the N−M=6 alcoholic beverages from the distributor or pool buyer to the alcoholic beverage retailer.

Upon determining that the distributor or pool buyer does not have at least N−M=6 alcoholic beverages, the method, non-transitory computer readable medium, and system would then manually or automatically locate a manufacturer. N−M-K alcoholic beverages would then be obtained from the manufacturer. As used herein, K is the number of beverages possessed by the distributor or pool buyer where K<M<N. By way of example, the present section will take K=2, with the understanding that the value of K is not particularly limited. Accordingly, assuming N=10 and M=4, N−M−K (10−4−2=4) alcoholic beverages would be obtained from the manufacturer. The M=4 alcoholic beverages from the alcoholic beverage retailer, the K=2 alcoholic beverages from the distributor or pool buyer, and the N−M−K=4 alcoholic beverages from the manufacturer can then be delivered to the user to meet the electronic request of N=10 alcoholic beverages. The system may then, in some embodiments, initiate a real time transfer of the N−M=6 alcoholic beverages from the distributor or pool buyer to the alcoholic beverage retailer and then from the alcoholic beverage retailer to the at least one user.

Certain examples of the present disclosure further relate to an inventory management method, computer readable medium, and system. In some examples, the inventory management system method, computer readable medium, and system, has the same steps as the method, computer readable medium, and system whereby inventory is transferred within the supply chain to fulfill an electronic request of the at least one user, except for the fact that the at least one user is replaced by an inventory manager. As used herein an "inventory manager" is a third party (i.e., an individual or entity outside of the supply chain) that manages the supply chain to ensure that the distributor or pool buyer and the retailer have sufficient inventory. The inventory manager can be, without limitation, a warehouse manager, a software service configured to perform the steps described herein, an artificial intelligence, at least one device configured to perform the steps described herein, or any combination thereof. In some examples, where the inventory manager does not include a physical location, such as, but not limited to, when the inventory manager is a software service, any steps of including the delivery of the at least one alcoholic beverage to the inventory manager may be omitted. In further examples, the "request to purchase N alcoholic beverages" may be replaced by "a request to fulfill inventory of N alcoholic beverages." In some such examples, the alcoholic beverages may never be in physical possession of the inventory manager. Instead, the inventory manager may ensure that at least one of the alcoholic beverage retailer or the distributor or pool buyer has at least N alcoholic beverages. In some further examples, the inventory management to an inventory management method, computer readable medium, and system may use analogous steps to manage inventory of the at least one item that is not an alcoholic beverage, as described herein.

In some embodiments, the method may include inputting a record of a transfer of the at least one alcoholic beverage within the supply chain (e.g., from a distributor or pool buyer to an alcoholic beverage retailer, from the alcoholic beverage retailer to at least one delivery vehicle, from the at least one delivery vehicle to the at least one user), into a database. The inputting can be performed manually or automatically according to certain embodiments. The database can be any suitable database, such as, but not limited to, a spreadsheet or a blockchain. In some examples, the records of the transfer of the at least one alcoholic beverage within the supply chain can be reproduced from the database, e.g., for a regulatory or tax audit. In certain implementations, records of transaction charges within the supply chain can also be recorded within the supply chain and similarly reproduced. In further implementations, the database may be managed by the inventory manager described herein. In some examples, the database may also record transactions, charges, or transfers corresponding to the at least one item that is not an alcoholic beverage, as described herein.

FIG. 1 shows a non-limiting example of an alcoholic beverage distribution system according to certain aspects of the present disclosure. The example shown is not limiting and can include user 100, device 105, computer network 110, server 150, database 115, manufacturer 120, distributor or pool buyer 125, alcoholic beverage retailer 130, first delivery vehicle 135, second delivery vehicle 140, and third delivery vehicle 145. The first delivery vehicle 135, second delivery vehicle 140, and third delivery vehicle 145 may be the same vehicle or different vehicles without limitation. In certain examples, manufacturer 120 and at least one of delivery vehicles 135, 140, and 145 may not be present in the system or in any particular steps performed by the system.

The device 105 may be a user device, personal computer, laptop computer, mainframe computer, palmtop computer, personal assistant, mobile device, or any other suitable processing apparatus. In some examples, the device 105 includes software, such as but, not limited to a smartphone application or computer software, that obtains and delivers beverages through at least one supply chain. In some cases, the software incorporates a beverage delivery application (or software). The beverage delivery application may either include or communicate with the computer network 110. Device 105 is an example of, or includes aspects of, the corresponding element described with reference to FIG. 2.

A computer network 110 (or cloud) may be configured to provide on-demand availability of computer system resources, such as data storage and computing power. In some examples, the cloud provides resources without active management by the user 100. The term computer network 110 is sometimes used to describe data centers available to many users 100 over the Internet. Some large computer networks 110 have functions distributed over multiple locations from central servers 150. A server 150 may be designated as an edge server if it has a direct or close connection to a user 100. In some cases, a computer network 110 is limited to a single organization. In other examples, the computer network 110 is available to many organizations. In one example, a computer network 110 includes a multi-layer communications network comprising multiple edge routers and core routers. In another example, a computer network 110 is based on a local collection of switches in a single physical location.

A database 115 is an organized collection of data. For example, a database 115 stores data in a specified format known as a schema. A database 115 may be structured as a single database, a distributed database, multiple distributed databases, or an emergency backup database. In some cases, a database controller may manage data storage and processing in a database 115. In some cases, a user 100 interacts with database 115 via a database controller. In other cases, database controller may operate automatically without user 100 interaction.

A server 150 provides one or more functions to users 100 linked by way of one or more of the various networks. In some cases, the server 150 includes a single microprocessor board, which includes a microprocessor responsible for controlling all aspects of the server 150. In some cases, a server 150 uses microprocessor and protocols to exchange data with other devices 105 or other users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 150 is configured to send and receive hypertext markup language (HTML) formatted files (e.g., for displaying web pages). In various embodiments, a server 150 comprises a general purpose computing device, a personal computer, a laptop computer, a mainframe computer, a super computer, a quantum computer, or any other suitable processing apparatus.

According to some embodiments, device 105 receives an electronic request from at least one user 100, where the electronic request includes a request to purchase N alcoholic beverages, where N≥1, and where N is a quantity of alcoholic beverages requested by the user 100. In some examples, device 105 determines whether the alcoholic beverage retailer 130 has at least N alcoholic beverages. In various examples described herein, a user 100 may include an inventory manager. In some examples, device 105 determines whether the distributor or pool buyer 125 has at least N−M alcoholic beverages, where M<N, and where M is a number of alcoholic beverages possessed by the alcoholic beverage retailer 130 upon determining that the alcoholic beverage retailer 130 does not have the at least N alcoholic beverages.

According to some embodiments, first delivery vehicle 135 transfers at least one alcoholic beverage from the manufacturer 120 to the distributor or pool buyer 125. According to some embodiments, first delivery vehicle 135 transfers at least one additional alcoholic beverage from the manufacturer 120 to the distributor or pool buyer 125. This least one additional alcoholic beverage, may in some embodiments, be associated with a promotional giveaway. According to some embodiments, first delivery vehicle 135 obtains N−M−K alcoholic beverages from the manufacturer 120 upon determining that the distributor or pool buyer 125 does not have at least N−M alcoholic beverages, where K is a number of beverages possessed by the distributor or pool buyer and where K<M<N.

According to some embodiments, first delivery vehicle 135 or second delivery vehicle 140 transfers at least one alcoholic beverage from the distributor or pool buyer 125 to the alcoholic beverage retailer 130. According to some embodiments, first delivery vehicle 135 or second delivery vehicle 140 transfers at least one additional alcoholic beverage from the distributor or pool buyer 125 to the alcoholic beverage retailer 130. According to some embodiments, second delivery vehicle 140 obtains the N−M alcoholic beverages from the distributor or pool buyer 125 upon determining that the distributor or pool buyer 125 has the at least N−M alcoholic beverages. In some examples, first delivery vehicle 135 or second delivery vehicle 140 obtains the K alcoholic beverages from the distributor or pool buyer 125 upon determining that the distributor or pool buyer 125 does not have the at least N−M alcoholic beverages.

According to some embodiments, first delivery vehicle 135, second delivery vehicle 140, or third delivery vehicle 145 obtains the at least one alcoholic beverage from the alcoholic beverage retailer 130. In some examples, first delivery vehicle 135, second delivery vehicle 140, or third delivery vehicle 145 delivers the at least one alcoholic beverage to the at least one user 100. In some examples, first delivery vehicle 135, second delivery vehicle 140, or third delivery vehicle 145 obtains the at least one item that is not an alcoholic beverage from the at least one retailer. In some examples, first delivery vehicle 135, second delivery vehicle 140, or third delivery vehicle 145 delivers the at least one alcoholic beverage and the at least one item that is not an alcoholic beverage to the at least one user 100.

In some examples, first delivery vehicle 135, second delivery vehicle 140, or third delivery vehicle 145 obtains at least one item that is not an alcoholic beverage from the at least one retailer selling the at least one item that is not an alcoholic beverage. Examples of the at least one item that is not an alcoholic beverage are described above. In some examples, first delivery vehicle 135, second delivery vehicle 140, or third delivery vehicle 145 delivers the at least one alcoholic beverage and the at least one item that is not an alcoholic beverage to the at least one user 100.

According to some embodiments, first delivery vehicle 135, second delivery vehicle 140, or third delivery vehicle 145 obtains the at least one additional alcoholic beverage from the alcoholic beverage retailer 130. In some examples, first delivery vehicle 135, second delivery vehicle 140, or third delivery vehicle 145 obtains the at least one free alcoholic beverage from the manufacturer 120. In some examples, first delivery vehicle 135, second delivery vehicle 140, or third delivery vehicle 145 delivers the at least one free alcoholic beverage and the at least one additional alcoholic beverage to the at least one user 100. In some examples, first delivery vehicle 135, second delivery vehicle 140, or third delivery vehicle 145 delivers the at least one alcoholic beverage and the at least one free alcoholic beverage to the at least one user 100.

According to some embodiments, first delivery vehicle 135, second delivery vehicle 140, or third delivery vehicle 145 obtains, upon determining that the alcoholic beverage retailer 130 has at least N alcoholic beverages, N alcoholic beverages from the alcoholic beverage retailer 130 and delivering the N alcoholic beverages to the at least one user 100. In some examples, first delivery vehicle 135, second delivery vehicle 140, or third delivery vehicle 145 obtains the M alcoholic beverages from the alcoholic beverage retailer 130 upon determining that the distributor or pool buyer 125 has at least N-M alcoholic beverages. In some examples, first delivery vehicle 135, second delivery vehicle 140, or third delivery vehicle 145 delivers the N alcoholic beverages to the at least one user 100 upon determining that the distributor or pool buyer 125 has the at least N-M alcoholic beverages. In some examples, first delivery vehicle 135, second delivery vehicle 140, or third delivery vehicle 145 obtains the M alcoholic beverages from the alcoholic beverage retailer 130 upon determining that the distributor or pool buyer 125 does not have the at least N-M alcoholic beverages. In some examples, first delivery vehicle 135, second delivery vehicle 140, or third delivery vehicle 145 delivers the N alcoholic beverages to the at least one user 100 upon determining that the distributor or pool buyer 125 does not have the at least N-M alcoholic beverages.

Figure 2:
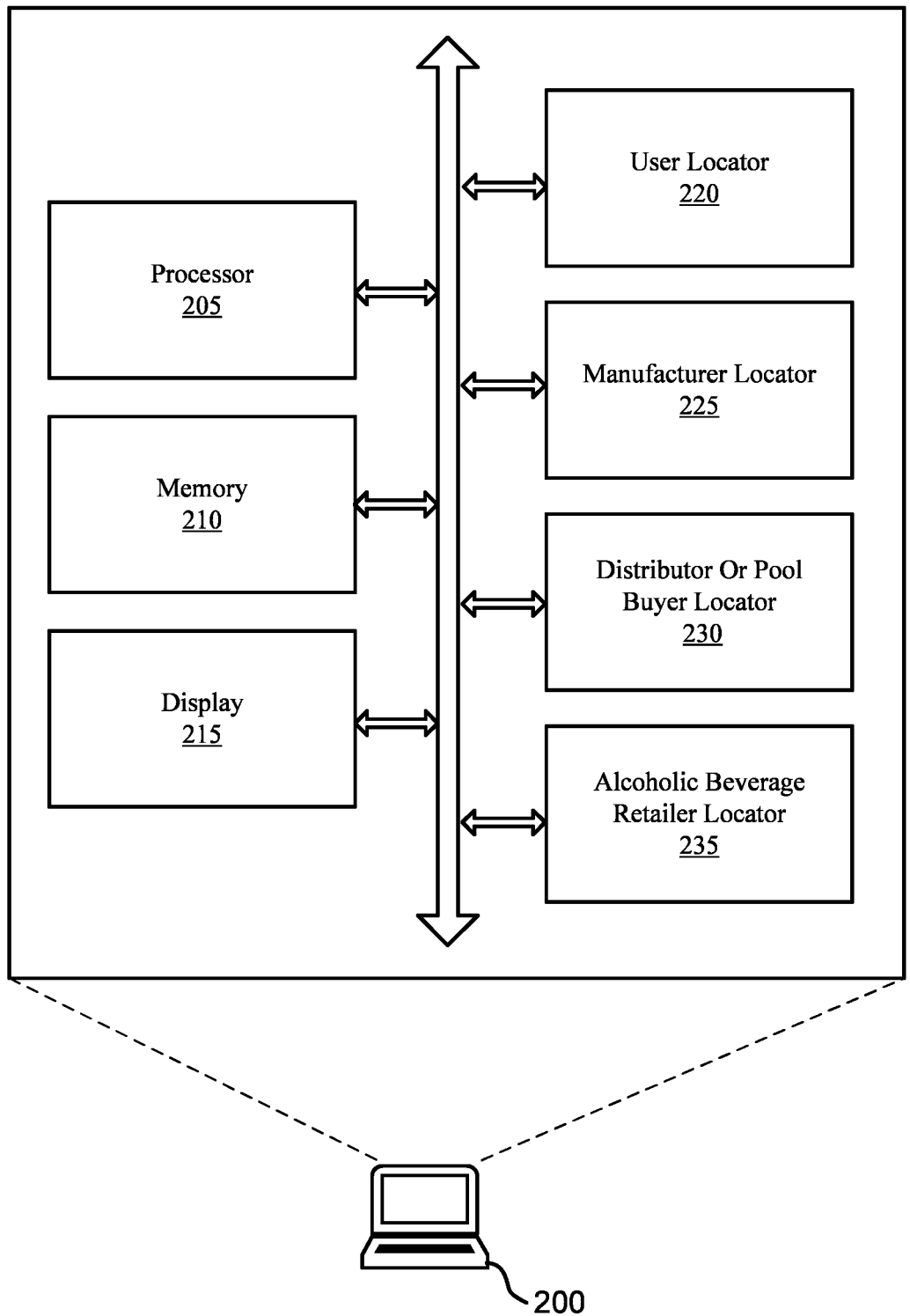

FIG. 2 shows an example of example beverage distribution system according to aspects of the present disclosure. Device 200 is an example of, or includes aspects of, the corresponding element described with reference to FIG. 1. In one embodiment, device 200 includes processor 205, memory 210, display 215, user locator 220, manufacturer locator 225, distributor or pool buyer locator 230, and alcoholic beverage retailer locator 235.

A processor 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 205 is configured to operate a memory 210 array using a memory controller. In other cases, a memory controller is integrated into the processor 205. In some cases, the processor 205 is configured to execute computer-readable instructions stored in a memory 210 to perform various functions. In some embodiments, a processor 205 includes special purpose components for modem processing, baseband processing, digital signal processing, or transmission processing.

Software may include code to implement aspects of the present disclosure. Software may be stored in a non-transitory computer-readable medium such as system memory 210 or other memory. In some cases, the software may not be directly executable by the processor 205, but may cause a computer (e.g., when compiled and executed) to perform functions described herein.

Examples of memory 210 include random access memory (RAM), read-only memory (ROM), a hard disk, solid state memory, etc. In some examples, memory 210 is used to store computer-readable, computer-executable software including instructions that, when executed, cause a processor 205 to perform various functions described herein. In some cases, the memory 210 includes, among other things, a basic input/output system (BIOS) which controls basic hardware or software operation such as the interaction with peripheral components or devices. In some cases, memory 210 includes a memory controller that operates memory cells. For example, the memory controller can include a row decoder, column decoder, or both. In some cases, memory cells within memory 210 store information in the form of a logical state.

In some cases, device 200 may include a user interface. A user interface may enable a user to interact with device 200. In some embodiments, the user interface may include an audio device, such as an external speaker system, an external display device such as a display screen (e.g., display 215), an input device (e.g., remote control device interfaced with the user interface directly or through an IO controller module), etc. In some cases, a user interface may include a GUI.

In some examples, device 200 (e.g., a user interface of device 200) may include an input device such as a computer mouse, keyboards, keypads, trackballs, voice recognition devices, etc. An input component may include any combination of devices that allow users to input information into device 200, such as buttons, a keyboard, switches, and/or dials. In some examples, the input component may include a touch-screen digitizer overlaid onto the display 215 that can sense touch and interact with the display 215.

According to some embodiments, processor 205 receives an electronic request from at least one user to purchase at least one alcoholic beverage. According to some embodiments, processor 205 receives an electronic request from at least one user, where the electronic request includes a request to purchase at least one alcoholic beverage and a request to purchase at least one item that is not an alcoholic beverage.

In some examples, processor 205 charges the at least one user for the at least one alcoholic beverage and the at least one item that is not an alcoholic beverage, where a resulting charge appears as a single transaction on a bank account of the at least one user. In some examples, processor 205 divides, without any interaction by the at least one user, the resulting charge between the alcoholic beverage retailer and the at least one retailer. In some examples, processor 205 divides, without any interaction by the at least one user, the resulting charge between the manufacturer, the pool buyer or distributor, the alcoholic beverage retailer, the at least one retailer, a delivery agent, or any combination thereof.

According to some embodiments, processor 205 determines a location of at least one user. In some examples, processor 205 retrieves advertising data from the manufacturer, where the advertising data comprises information (e.g., promotional giveaway information, etc.) associated with at least one free alcoholic beverage. In some examples, processor 205 receives a first electronic request from the user to receive the at least one free alcoholic beverage. In some examples, processor 205 receives a second electronic request to purchase at least one additional alcoholic beverage.

In some examples, processor 205 receives a request to deliver the at least one free alcoholic beverage to the at least one user. In some examples, processor 205 receives an electronic request from at least one user, where the electronic request includes a second request to purchase the least one alcoholic beverage.

According to some embodiments, processor 205 receives an electronic request from at least one user, where the electronic request includes a request to purchase N alcoholic beverages, where N≥1, and where N is a quantity of alcoholic beverages requested by the user. In some examples, processor 205 determines whether the alcoholic beverage retailer has at least N alcoholic beverages. In some examples, processor 205 determines whether the distributor or pool buyer has at least N−M alcoholic beverages, where M<N, and where M is a number of alcoholic beverages possessed by the alcoholic beverage retailer upon determining that the alcoholic beverage retailer does not have the at least N alcoholic beverages.

In some examples, processor 205 is configured to instruct a first delivery vehicle to transfer the at least one alcoholic beverage from the distributor or pool buyer to the alcoholic beverage retailer. In some examples, processor 205 is configured to instruct a second delivery to obtain the at least one alcoholic beverage from the alcoholic beverage retailer. In some examples, processor 205 is configured to instruct the second delivery vehicle to deliver the at least one alcoholic beverage to the at least one user.

According to some embodiments, display 215 presents the advertising data, from at least one manufacturer, to at least one user. In some examples, display 215 displays, as a prerequisite for delivering the at least one free alcoholic beverage, at least one alcoholic beverage for purchase by the at least one user.

According to some embodiments, user locator 220 determines a location of the at least one user. This may occur through GPS or another suitable method as described above.

According to some embodiments, manufacturer locator 225 locates a manufacturer selling at least one alcoholic beverage requested by the at least one user, where the manufacturer is located at a first predetermined distance from the location of the at least one user. According to some embodiments, manufacturer locator 225 locates a manufacturer upon determining that the distributor or pool buyer does not have at least N−M alcoholic beverages.

According to some embodiments, distributor or pool buyer locator 230 locates a distributor or pool buyer carrying (e.g., selling) the at least one alcoholic beverage requested by the at least one user, where the distributor or pool buyer is located at a first predetermined distance from the location of an alcoholic beverage retailer selling the at least one alcoholic beverage requested by at least one user. According to some embodiments, distributor or pool buyer locator 230 locates a distributor or pool buyer upon determining that the alcoholic beverage retailer does not have at least N alcoholic beverages.

According to some embodiments, alcoholic beverage retailer locator 235 locates an alcoholic beverage retailer, where the alcoholic beverage retailer is located at a first predetermined distance from the location of the at least one user. According to some embodiments, alcoholic beverage retailer locator 235 locates an alcoholic beverage retailer, where the alcoholic beverage retailer is located at a first predetermined distance from the location of an alcoholic beverage retailer selling the at least one alcoholic beverage requested by the at least one user. According to some embodiments, alcoholic beverage retailer locator 235 locates an alcoholic beverage retailer.

In some examples, alcoholic beverage retailer locator 235 locates at least one retailer selling the at least one item that is not an alcoholic beverage. In some examples, alcoholic beverage retailer locator 235 locates at least one retailer selling the at least one item that is not an alcoholic beverage.

Figure 3:
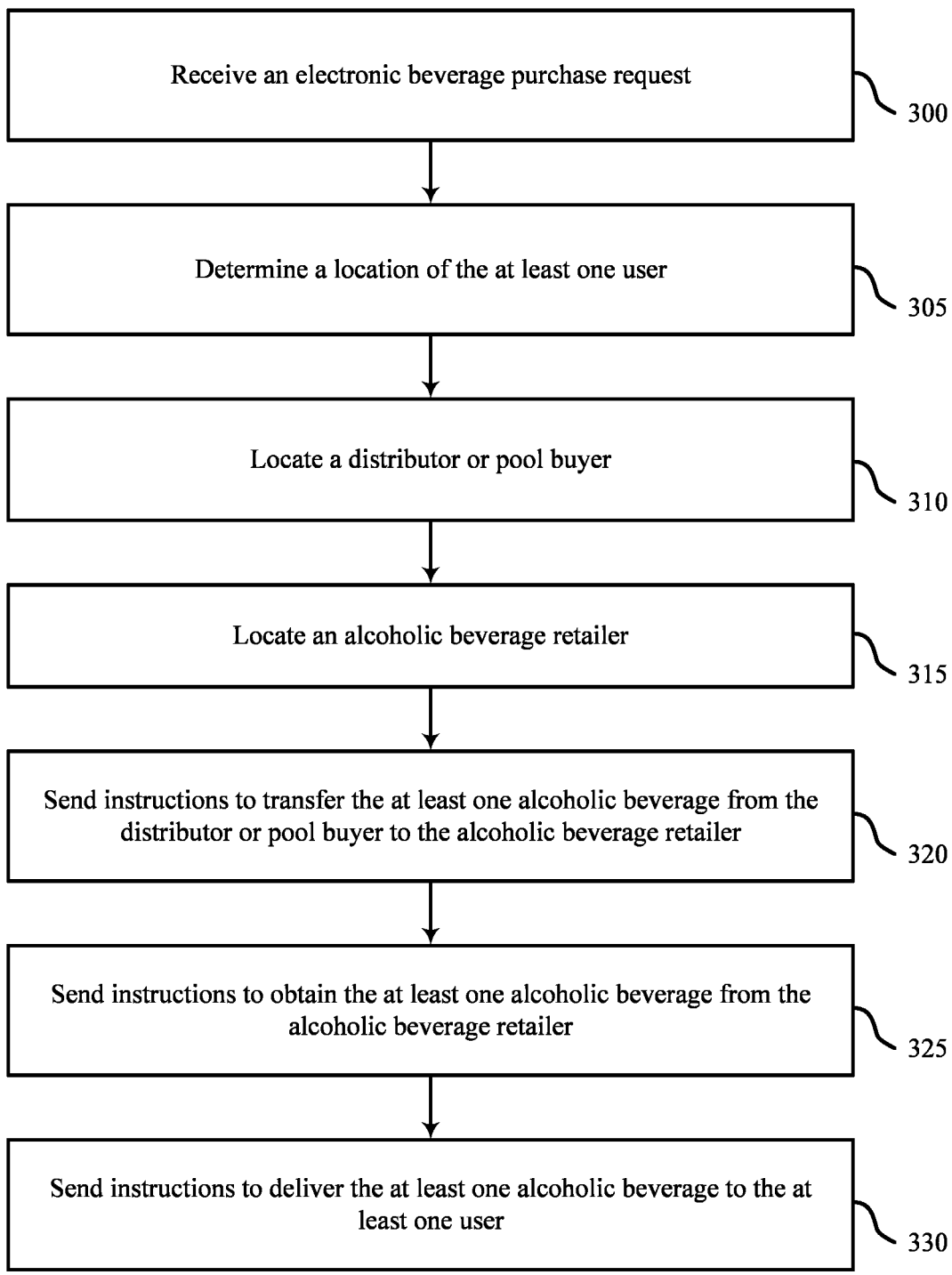
FIG. 3 shows an example process for obtaining and delivering at least one alcoholic beverage through at least one supply chain according to aspects of the present disclosure.

FIG. 3 shows an example of a process for obtaining and delivering at least one alcoholic beverage through at least one supply chain according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, the system receives an electronic request from at least one user to purchase at least one alcoholic beverage. In some cases, the operations of this step refer to, or may be performed by, a processor as described with reference to FIG. 2. At operation 305, the system determines a location of the at least one user. In some cases, the operations of this step refer to, or may be performed by, a user locator as described with reference to FIG. 2. At operation 310, the system locates a distributor or pool buyer carrying the at least one alcoholic beverage requested by the at least one user, where the distributor or pool buyer is located at a first predetermined distance from the location of an alcoholic beverage retailer selling the at least one alcoholic beverage requested by the at least one user. In some cases, the operations of this step refer to, or may be performed by, a distributor or pool buyer locator as described with reference to FIG. 2. At operation 315, the system locates the alcoholic beverage retailer, where the alcoholic beverage retailer is located at a second predetermined distance from the location of the at least one user. In some cases, the operations of this step refer to, or may be performed by, an alcoholic beverage retailer locator as described with reference to FIG. 2. At operation 320, the system sends instructions to transfer the at least one alcoholic beverage from the distributor or pool buyer to the alcoholic beverage retailer. In some cases, the operations of this step refer to, or may be performed by, a second delivery vehicle as described with reference to FIG. 1. At operation 325, the system sends instructions to obtain the at least one alcoholic beverage from the alcoholic beverage retailer. In some cases, the operations of this step refer to, or may be performed by, a third delivery vehicle as described with reference to FIG. 1. At operation 330, the system sends instructions to deliver the at least one alcoholic beverage to the at least one user. In some cases, the operations of this step refer to, or may be performed by, a third delivery vehicle as described with reference to FIG. 1.

Figure 4:
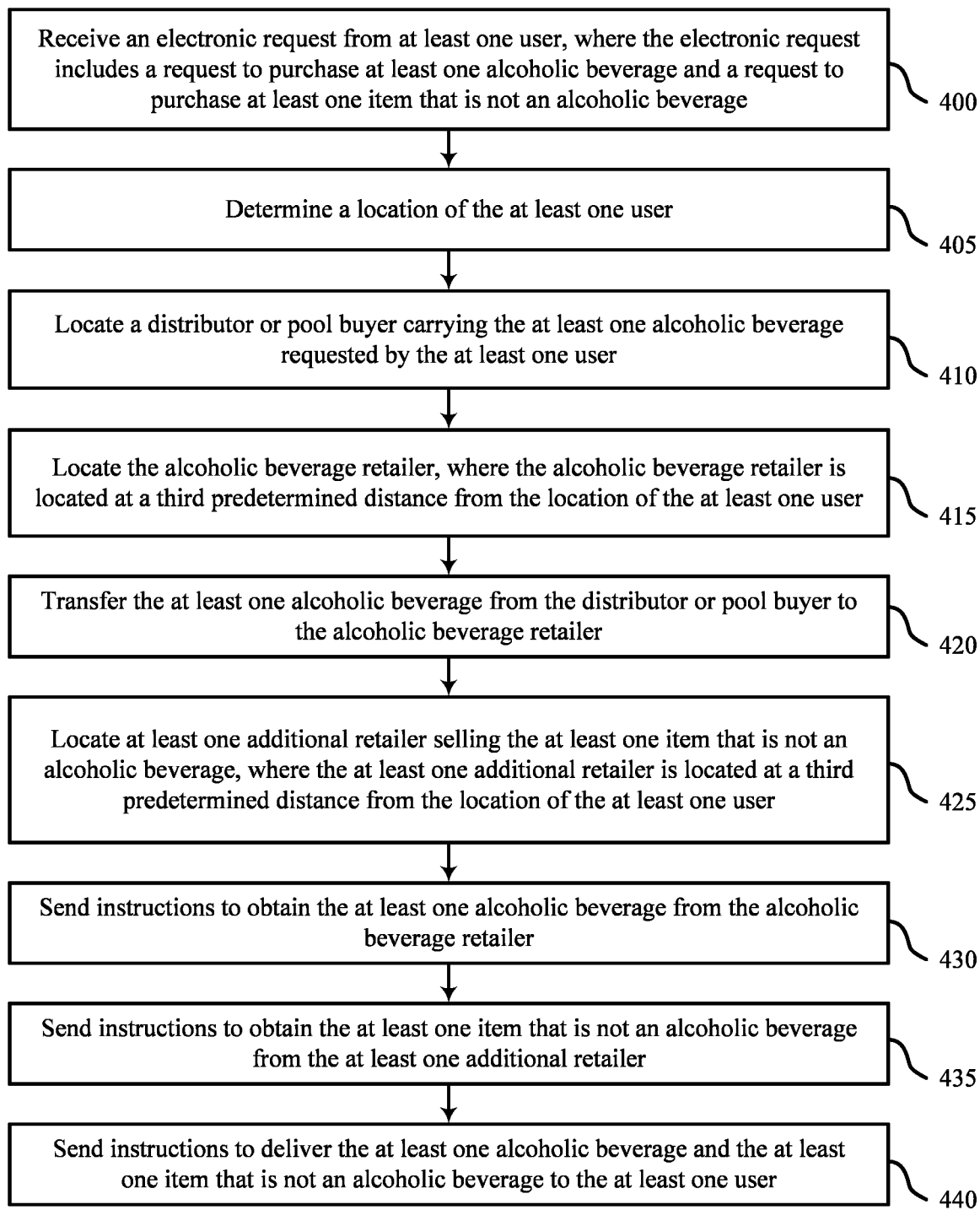
FIG. 4 and FIG. 5 show example processes for obtaining and delivering an alcoholic beverage and at least one item that is not an alcoholic beverage through at least one supply chain according to aspects of the present disclosure.

FIG. 4 shows an example of a process for obtaining and delivering at least one alcoholic beverage through at least one supply chain according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 400, the system receives an electronic request from at least one user, where the electronic request includes a request to purchase at least one alcoholic beverage and a request to purchase at least one item that is not an alcoholic beverage. In some cases, the operations of this step refer to, or may be performed by, a processor as described with reference to FIG. 2. At operation 405, the system determines a location of the at least one user. In some cases, the operations of this step refer to, or may be performed by, a user locator as described with reference to FIG. 2. At operation 410, the system locates a distributor or pool buyer carrying the at least one alcoholic beverage requested by the at least one user, where the distributor or pool buyer is located at a first predetermined distance from the location of an alcoholic beverage retailer selling the at least one alcoholic beverage requested by the at least one user. In some cases, the operations of this step refer to, or may be performed by, a distributor or pool buyer locator as described with reference to FIG. 2. At operation 415, the system locates the alcoholic beverage retailer, where the alcoholic beverage retailer is located at a second predetermined distance from the location of the at least one user. In some cases, the operations of this step refer to, or may be performed by, an alcoholic beverage retailer locator as described with reference to FIG. 2. At operation 420, the system transfers the at least one alcoholic beverage from the distributor or pool buyer to the alcoholic beverage retailer. In some cases, the operations of this step refer to, or may be performed by, a second delivery vehicle as described with reference to FIG. 1. At operation 425, the system locates at least one retailer selling the at least one item that is not an alcoholic beverage, where the at least one retailer is located at a third predetermined distance from the location of the at least one user. In some cases, the operations of this step refer to, or may be performed by, an alcoholic beverage retailer locator as described with reference to FIG. 2. At operation 430, the system sends instructions to obtain the at least one alcoholic beverage from the alcoholic beverage retailer. In some cases, the operations of this step refer to, or may be performed by, a third delivery vehicle as described with reference to FIG. 1. At operation 435, the system sends instructions to obtain the at least one item that is not an alcoholic beverage from the at least one retailer selling the at least one item that is not an alcoholic beverage. In some cases, the operations of this step refer to, or may be performed by, a third delivery vehicle as described with reference to FIG. 1. At operation 440, the system sends instructions to deliver the at least one alcoholic beverage and the at least one item that is not an alcoholic beverage to the at least one user. In some cases, the operations of this step refer to, or may be performed by, a third delivery vehicle as described with reference to FIG. 1.

Figure 5:
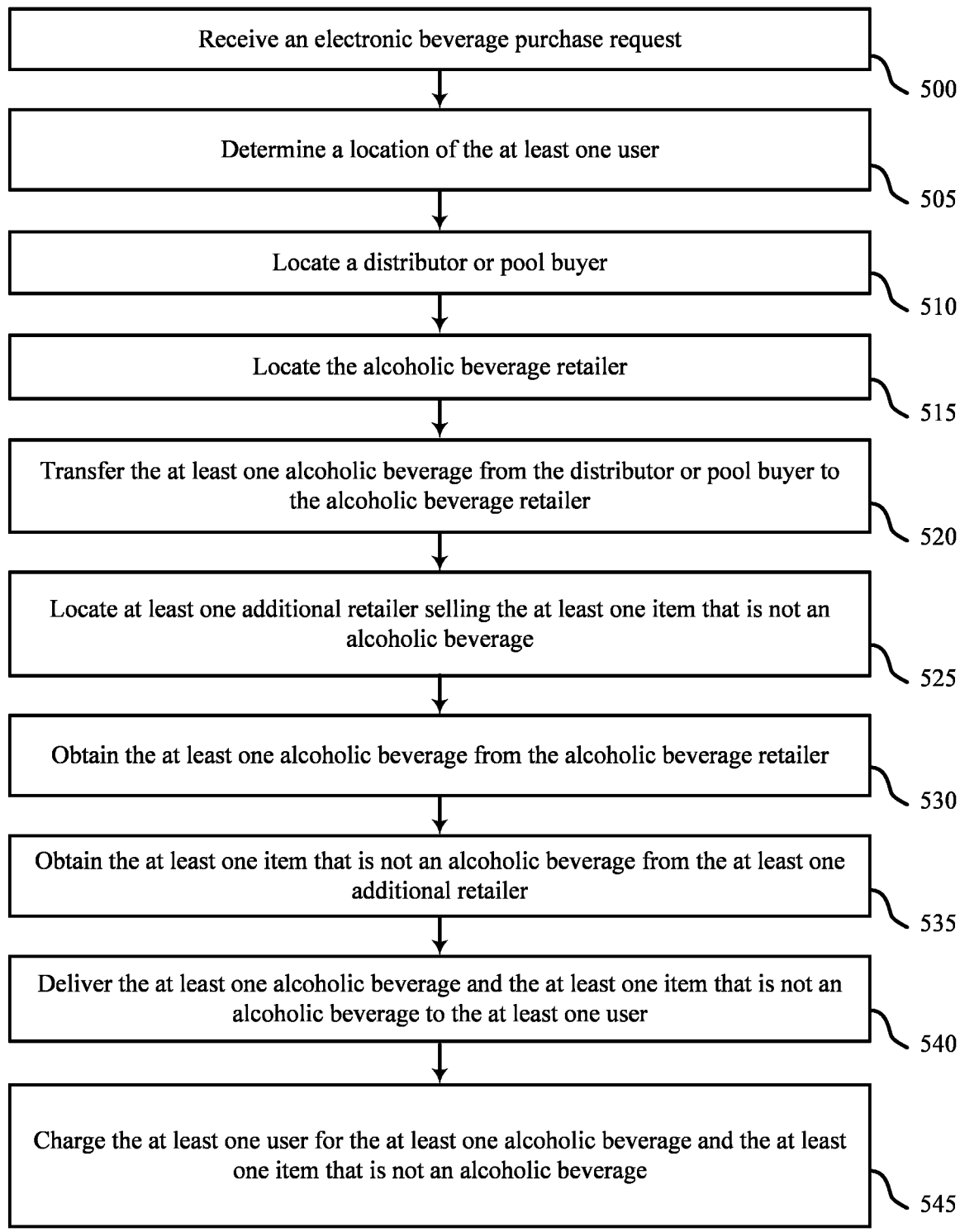

FIG. 5 shows an example of a process for obtaining and delivering at least one alcoholic beverage through at least one supply chain according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives an electronic request from at least one user, where the electronic request includes a request to purchase at least one alcoholic beverage and a request to purchase at least one item that is not an alcoholic beverage. In some cases, the operations of this step refer to, or may be performed by, a processor as described with reference to FIG. 2. At operation 505, the system determines a location of the at least one user. In some cases, the operations of this step refer to, or may be performed by, a user locator as described with reference to FIG. 2. At operation 510, the system locates a distributor or pool buyer carrying the at least one alcoholic beverage requested by the at least one user, where the distributor or pool buyer is located at a first predetermined distance from an alcoholic beverage retailer selling the at least one alcoholic beverage requested by the at least one user. In some cases, the operations of this step refer to, or may be performed by, a distributor or pool buyer locator as described with reference to FIG. 2. At operation 515, the system locates the alcoholic beverage retailer, where the alcoholic beverage retailer is located at a second predetermined distance from the location of the at least one user. In some cases, the operations of this step refer to, or may be performed by, an alcoholic beverage retailer locator as described with reference to FIG. 2. At operation 520, the system transfers the at least one alcoholic beverage from the distributor or pool buyer to the alcoholic beverage retailer. In some cases, the operations of this step refer to, or may be performed by, a second delivery vehicle as described with reference to FIG. 1. At operation 525, the system locates at least one retailer selling the at least one item that is not an alcoholic beverage, where the at least one retailer is located at a third predetermined distance from the location of the at least one user. In some cases, the operations of this step refer to, or may be performed by, an alcoholic beverage retailer locator as described with reference to FIG. 2. At operation 530, the system instructs the obtaining of the at least one alcoholic beverage from the alcoholic beverage retailer. In some cases, the operations of this step refer to, or may be performed by, a third delivery vehicle as described with reference to FIG. 1. At operation 535, the system instructs the obtaining of the at least one item that is not an alcoholic beverage from the at least one retailer. In some cases, the operations of this step refer to, or may be performed by, a third delivery vehicle as described with reference to FIG. 1. At operation 540, the system delivers the at least one alcoholic beverage and the at least one item that is not an alcoholic beverage to the at least one user. In some cases, the operations of this step refer to, or may be performed by, a third delivery vehicle as described with reference to FIG. 1. At operation 545, the system charges the at least one user for the at least one alcoholic beverage and the at least one item that is not an alcoholic beverage. In some cases, the operations of this step refer to, or may be performed by, a processor as described with reference to FIG. 2.

Figure 6:
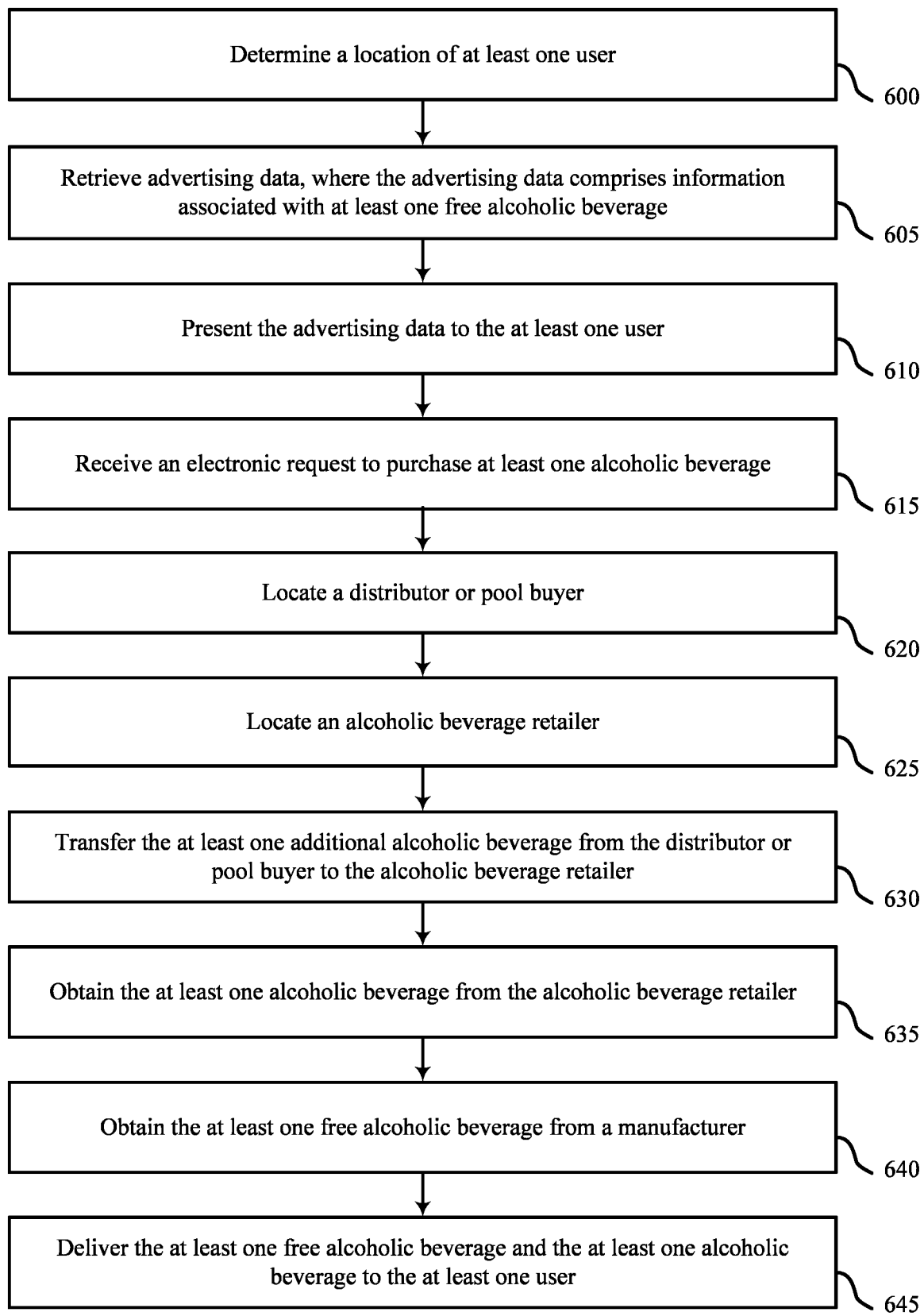
FIG. 6 shows an example process for obtaining and delivering at least one free alcoholic beverage and at least one additional alcoholic beverage through at least one supply chain according to aspects of the present disclosure.

FIG. 6 shows an example of a process for obtaining and delivering at least one alcoholic beverage through at least one supply chain according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system determines a location of at least one user. In some cases, the operations of this step refer to, or may be performed by, a processor as described with reference to FIG. 2. At operation 605, the system retrieves advertising data, where the advertising data includes information associated with the at least one free alcoholic beverage. In some cases, the operations of this step refer to, or may be performed by, a processor as described with reference to FIG. 2. At operation 610, the system presents the advertising data to the at least one user. In some cases, the operations of this step refer to, or may be performed by, a display as described with reference to FIG. 2. At operation 615, the system receives an electronic request to purchase at least one alcoholic beverage. In some cases, the operations of this step refer to, or may be performed by, a processor as described with reference to FIG. 2. At operation 620, the system locates a distributor or pool buyer, where the distributor or pool buyer is located at a first predetermined distance from the location of an alcoholic beverage retailer. In some cases, the operations of this step refer to, or may be performed by, a distributor or pool buyer locator as described with reference to FIG. 2. At operation 625, the system locates the alcoholic beverage retailer, where the alcoholic beverage retailer is located at a second predetermined distance from the location of the at least one user. In some cases, the operations of this step refer to, or may be performed by, an alcoholic beverage retailer locator as described with reference to FIG. 2. At operation 630, the system transfers the at least one alcoholic beverage from the distributor or pool buyer to the alcoholic beverage retailer. In some cases, the operations of this step refer to, or may be performed by, a first delivery vehicle as described with reference to FIG. 1. At operation 635, the system instructs the obtaining of the at least one alcoholic beverage from the alcoholic beverage retailer. In some cases, the operations of this step refer to, or may be performed by, a third delivery vehicle as described with reference to FIG. 1. At operation 640, the system instructs the obtaining of the at least one free alcoholic beverage from a manufacturer. In some cases, the operations of this step refer to, or may be performed by, a 6third delivery vehicle as described with reference to FIG. 1. At operation 645, the system delivers the at least one free alcoholic beverage and the at least one alcoholic beverage to the at least one user. In some cases, the operations of this step refer to, or may be performed by, a third delivery vehicle as described with reference to FIG. 1.

Figure 7:
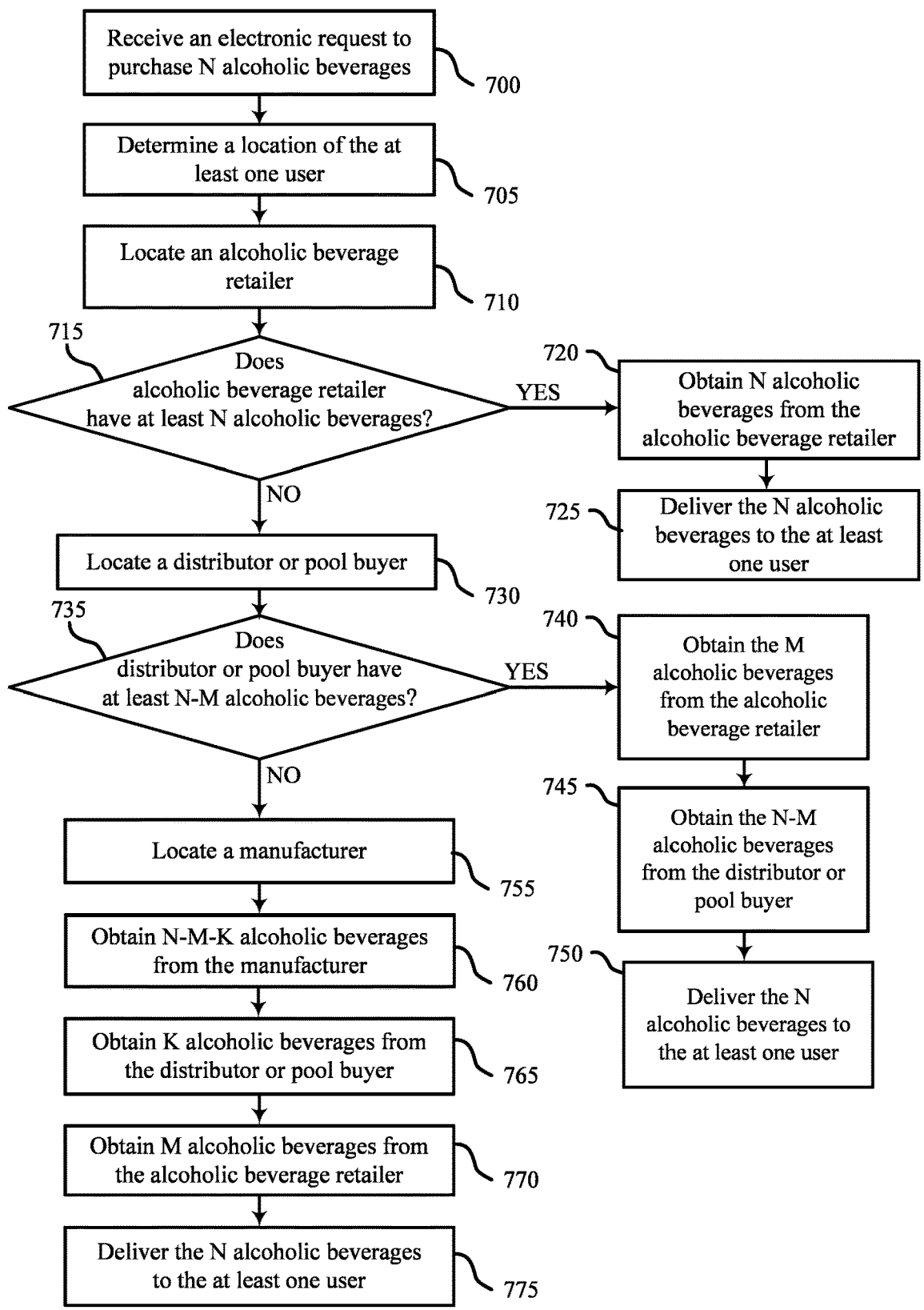
FIG. 7 and FIG. 8 show example processes for obtaining and delivering a specific number of alcoholic beverages through at least one supply chain according to aspects of the present disclosure.

FIG. 7 shows an example process for obtaining and delivering a specific number of alcoholic beverages through at least one supply chain according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives an electronic request from at least one user, where the electronic request includes a request to purchase N alcoholic beverages, where $N \geq 1$ and where N is a quantity of alcoholic beverages requested by the user. In some cases, the operations of this step refer to, or may be performed by, a processor as described with reference to FIG. 2. At operation 705, the system determines a location of the at least one user. In some cases, the operations of this step refer to, or may be performed by, a user locator as described with reference to FIG. 2. At operation 710, the system locates an alcoholic beverage retailer, where the alcoholic beverage retailer is located at a first predetermined distance from the location of the at least one user. In some cases, the operations of this step refer to, or may be performed by, an alcoholic beverage retailer locator as described with reference to FIG. 2. At operation 715, the system determines whether the alcoholic beverage retailer has at least N alcoholic beverages. In some cases, the operations of this step refer to, or may be performed by, a processor as described with reference to FIG. 2. At operation 720, the system instructs the obtaining of, upon determining that the alcoholic beverage retailer has at least N alcoholic beverages, N alcoholic beverages from the alcoholic beverage retailer and delivers the N alcoholic beverages to the at least one user. In some cases, the operations of this step refer to, or may be performed by, a third delivery vehicle as described with reference to FIG. 1. At operation 725, the system locates a distributor or pool buyer upon determining that the alcoholic beverage retailer does not have at least N alcoholic beverages, where the distributor or pool buyer is located at a second predetermined distance from the location of the alcoholic beverage retailer. In some cases, the operations of this step refer to, or may be performed by, a distributor or pool buyer locator as described with reference to FIG. 2. At operation 730, the system determines whether the distributor or pool buyer has at least N–M alcoholic beverages, where M<N, and where M is a number of alcoholic beverages possessed by the alcoholic beverage retailer upon determining that the alcoholic beverage retailer does not have the at least N alcoholic beverages. In some cases, the operations of this step refer to, or may be performed by, a processor as described with reference to FIG. 2. At operation 735, the system instructs the obtaining of the M alcoholic beverages from the alcoholic beverage retailer upon determining that the distributor or pool buyer has at least N–M alcoholic beverages. In some cases, the operations of this step refer to, or may be performed by, a third delivery vehicle as described with reference to FIG. 1. At operation 740, the system instructs the obtaining of the N–M alcoholic beverages from the distributor or pool buyer upon determining that the distributor or pool buyer has the at least N–M alcoholic beverages. In some cases, the operations of this step refer to, or may be performed by, a second delivery vehicle as described with reference to FIG. 1. At operation 745, the system delivers the N alcoholic beverages to the at least one user upon determining that the distributor or pool buyer has the at least N–M alcoholic beverages. In some cases, the operations of this step refer to, or may be performed by, a third delivery vehicle as described with reference to FIG. 1. At operation 750, the system locates a manufacturer upon determining that the distributor or pool buyer does not have at least N–M alcoholic beverages, where the manufacturer is located at a third predetermined distance from the location of the distributor or pool buyer. In some cases, the operations of this step refer to, or may be performed by, a manufacturer locator as described with reference to FIG. 2. At operation 755, the system instructs the obtaining of N–M–K alcoholic beverages from the manufacturer upon determining that the distributor or pool buyer does not have the at least N–M alcoholic beverages, where K<M<N. In some cases, the operations of this step refer to, or may be performed by, a first delivery vehicle as described with reference to FIG. 1. At operation 760, the system instructs the obtaining of the K alcoholic beverages from the distributor or pool buyer upon determining that the distributor or pool buyer does not have the at least N–M alcoholic beverages. In some cases, the operations of this step refer to, or may be performed by, a second delivery vehicle as described with reference to FIG. 1. At operation 765, the system instructs the obtaining of the M alcoholic beverages from the alcoholic beverage retailer upon determining that the distributor or pool buyer does not have the at least N–M alcoholic beverages. In some cases, the operations of this step refer to, or may be performed by, a third delivery vehicle as described with reference to FIG. 1. At operation 770, the system delivers the N alcoholic beverages to the at least one user upon determining that the distributor or pool buyer does not have the at least N–M alcoholic beverages. In some cases, the operations of this step refer to, or may be performed by, a third delivery vehicle as described with reference to FIG. 1.

Figure 8:
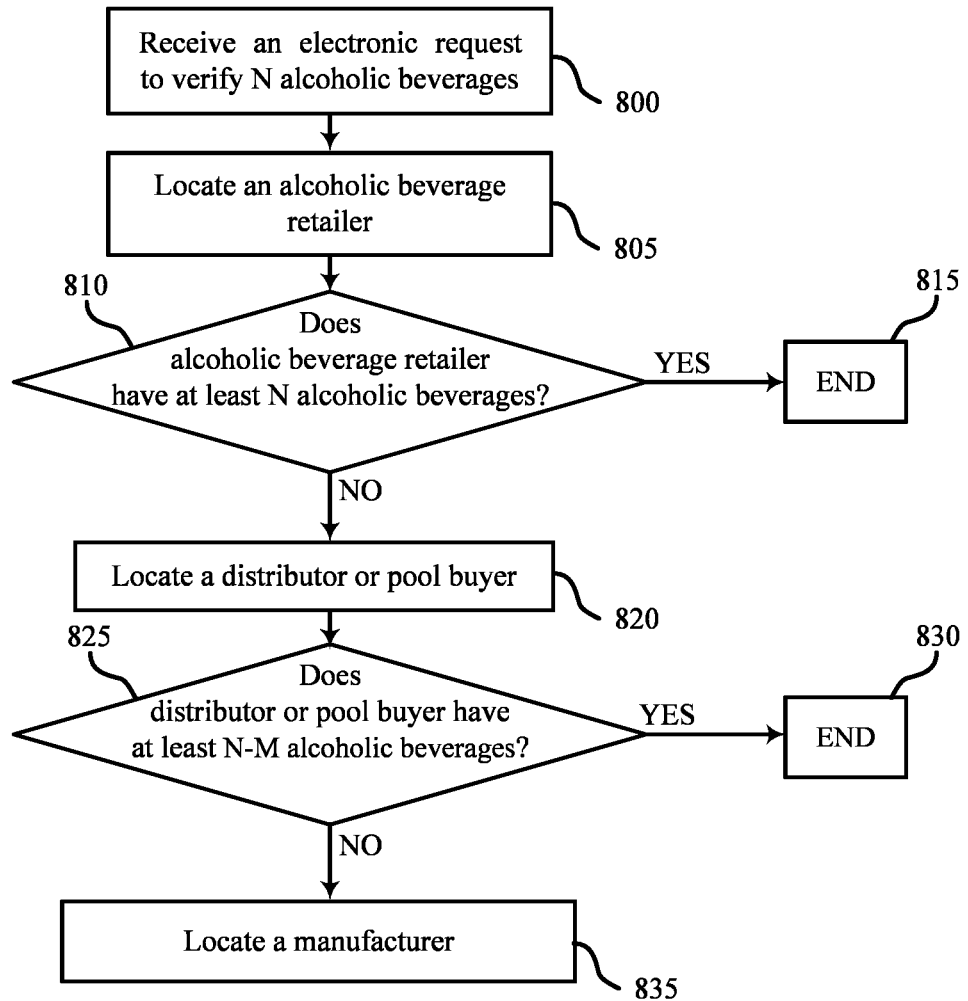

FIG. 8 shows an additional example process for obtaining and delivering a specific number of alcoholic beverages through at least one supply chain according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system receives an electronic request from at least one inventory manager, where the electronic request includes a request to verify that the retailer has N alcoholic beverages, where N≥1. In some cases, the operations of this step refer to, or may be performed by, a processor as described with reference to FIG. 2. In certain implementations, the electronic request may include an inquiry to verify that at least one of: the alcoholic beverage retailer or the distributor or pool buyer is in possession of N alcoholic beverages. At operation 805, the system locates an alcoholic beverage retailer. In some cases, the operations of this step refer to, or may be performed by, an alcoholic beverage retailer locator as described with reference to FIG. 2. At operation 810, the system verifies that the alcoholic beverage retailer has at least N alcoholic beverages. In some cases, the operations of this step refer to, or may be performed by, a processor as described with reference to FIG. 2. At operation 815, in scenarios where the system determines the alcoholic beverage retailer has at least N alcoholic beverages, the system may confirm or create a record of inventory. In some cases, the operations of this step refer to, or may be performed by, a processor as described with reference to FIG. 2. At operation 820, the system locates a distributor or pool buyer upon determining that the alcoholic beverage retailer does not have at least N alcoholic beverages. In some cases, the operations of this step refer to, or may be performed by, a distributor or pool buyer locator as described with reference to FIG. 2. At operation 825, the system determines whether the distributor or pool buyer has at least N–M alcoholic beverages, where M<N, and where M is a number of alcoholic beverages possessed by the alcoholic beverage retailer. In some cases, the operations of this step refer to, or may be performed by, a processor as described with reference to FIG. 2. At operation 830, in scenarios where the system determines the distributor or pool buyer has at least N–M alcoholic beverages, the system may, in some implementations, send instructions to obtain and deliver the N–M alcoholic beverages from the distributor or pool buyer to the alcoholic beverage retailer. In some implementations, at operation 830, the system may confirm or create a record of inventory. In some cases, the operations of this step refer to, or may be performed by, a processor as described with reference to FIG. 1. At operation 835, the system locates a manufacturer upon determining that the distributor or pool buyer does not have at least N–M alcoholic beverages. In some cases, the operations of this step refer to, or may be performed by, a manufacturer locator as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures. Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein. The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium. Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code. Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media. In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one".

The invention claimed is:

1. A non-transitory computer readable medium storing code, the code comprising instructions executable by a processor to:
   receive an electronic request from at least one user to purchase at least one alcoholic beverage;
   determine a location of the at least one user;
   locate a distributor or pool buyer carrying the at least one alcoholic beverage requested by the at least one user, where the distributor or pool buyer is located within a first predetermined distance from an alcoholic beverage retailer selling the at least one alcoholic beverage requested by the at least one user;
   locate the alcoholic beverage retailer, where the alcoholic beverage retailer is located within a second predetermined distance from the location of the at least one user;
   transfer the at least one alcoholic beverage from the distributor or pool buyer to the alcoholic beverage retailer;
   obtain the at least one alcoholic beverage from the alcoholic beverage retailer; and
   deliver the at least one alcoholic beverage to the at least one user.

2. The non-transitory computer readable medium of claim 1, where the electronic request further comprises a request to purchase at least one item that is not an alcoholic beverage.

3. The non-transitory computer readable medium of claim 2, further comprising instructions executable by the processor to locate at least one retailer selling the at least one item that is not an alcoholic beverage.

4. The non-transitory computer readable medium of claim 3, further comprising instructions executable by the processor to obtain the at least one item that is not an alcoholic beverage from the at least one retailer selling the at least one item that is not an alcoholic beverage.

5. The non-transitory computer readable medium of claim 4, further comprising instructions executable by the processor to deliver the at least one item that is not an alcoholic beverage to the at least one user.

6. The non-transitory computer readable medium of claim 4, further comprising instructions executable by the processor to calculate applicable taxes, delivery fees, or any combination thereof.

7. The non-transitory computer readable medium of claim 3, further comprising instructions executable by the processor to verify inventory of the at least one item that is not an alcoholic beverage.

8. The non-transitory computer readable medium of claim 2, further comprising instructions executable by the processor to charge the at least one user for the at least one alcoholic beverage and the at least one item that is not an alcoholic beverage.

9. The non-transitory computer readable medium of claim 8, further comprising instructions executable by the processor to allow the at least one user to pay for the at least one alcoholic beverage and the at least one item that is not an alcoholic beverage using multiple payment methods.

10. The non-transitory computer readable medium of claim 2, further comprising instructions executable by the processor to display the at least one alcoholic beverage and the at least one item that is not an alcoholic beverage to the at least one user before purchase.

11. The non-transitory computer readable medium of claim 1, further comprising instructions executable by the processor to apply a promotional discount.

12. The non-transitory computer readable medium of claim 1, further comprising instructions executable by the processor to determine the first and second predetermined distances.

13. The non-transitory computer readable medium of claim 1, further comprising instructions executable by the processor to provide a "real time" transfer of the at least one alcoholic beverage to the at least one user.

14. The non-transitory computer readable medium of claim 1, further comprising instructions executable by the processor to enable the at least one user to request to fulfill inventory of alcoholic beverages that are not in stock.

* * * * *